United States Patent
Kim et al.

(10) Patent No.: US 11,716,383 B2
(45) Date of Patent: *Aug. 1, 2023

(54) ACCESSING MULTIPLE EXTERNAL STORAGES TO PRESENT AN EMULATED LOCAL STORAGE THROUGH A NIC

(71) Applicant: VMware, Inc., Palo Alto, CA (US)

(72) Inventors: Jinpyo Kim, Cupertino, CA (US); Claudio Fleiner, San Jose, CA (US); Marc Fleischmann, Palo Alto, CA (US); Shoby A. Cherian, Dublin, CA (US); Anjaneya P. Gondi, Fremont, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/145,320

(22) Filed: Jan. 9, 2021

(65) Prior Publication Data
US 2022/0103490 A1 Mar. 31, 2022

Related U.S. Application Data

(60) Provisional application No. 63/084,513, filed on Sep. 28, 2020.

(51) Int. Cl.
*H04L 12/937* (2013.01)
*H04L 12/931* (2013.01)
(Continued)

(52) U.S. Cl.
CPC ........ *H04L 67/1097* (2013.01); *G06F 3/0604* (2013.01); *G06F 3/067* (2013.01);
(Continued)

(58) Field of Classification Search
CPC ....... H04L 49/253; H04L 49/10; H04L 49/70; H04L 49/901; H04L 67/1097
(Continued)

(56) References Cited

U.S. PATENT DOCUMENTS 5,393,483 A 2/1995 Chang et al.
5,884,313 A 3/1999 Talluri et al.
(Continued)

FOREIGN PATENT DOCUMENTS

CA 2672100 A1 * 6/2008 ............. G06F 1/183
CA 2918551 A1 * 7/2010 ............. G06F 15/16
(Continued)

OTHER PUBLICATIONS

Non-Published Commonly Owned Related International Patent Application PCT/US2021/042120 with similar specification, filed Jul. 17, 2021, 70 pages, VMware, Inc.
(Continued)

*Primary Examiner* — David R Lazaro
*Assistant Examiner* — Berhanu Shitayewoldetadik
(74) *Attorney, Agent, or Firm* — Adeli LLP

(57) ABSTRACT

Some embodiments provide a method of providing distributed storage services to a host computer from a network interface card (NIC) of the host computer. At the NIC, the method accesses a set of one or more external storages operating outside of the host computer through a shared port of the NIC that is not only used to access the set of external storages but also for forwarding packets not related to an external storage. In some embodiments, the method accesses the external storage set by using a network fabric storage driver that employs a network fabric storage protocol to access the external storage set. The method presents the external storage as a local storage of the host computer to a set of programs executing on the host computer. In some embodiments, the method presents the local storage by using a storage emulation layer on the NIC to create a local storage construct that presents the set of external storages as a local storage of the host computer.

20 Claims, 27 Drawing Sheets

(51) Int. Cl.

| | | |
|---|---|---|
| *H04L 12/879* | (2013.01) | |
| *H04L 15/16* | (2006.01) | |
| *H04L 12/933* | (2013.01) | |
| *H04L 29/08* | (2006.01) | |
| *G06F 15/16* | (2006.01) | |
| *G06F 13/42* | (2006.01) | |
| *G06F 9/455* | (2018.01) | |
| *G06F 13/10* | (2006.01) | |
| *G06F 13/16* | (2006.01) | |
| *H04L 67/1097* | (2022.01) | |
| *H04L 69/16* | (2022.01) | |
| *H04L 49/10* | (2022.01) | |
| *H04L 49/90* | (2022.01) | |
| *G06F 3/06* | (2006.01) | |
| *H04L 67/12* | (2022.01) | |
| *H04L 69/00* | (2022.01) | |
| *G06F 16/11* | (2019.01) | |
| *G06F 16/182* | (2019.01) | |
| *H04L 49/253* | (2022.01) | |
| *H04L 49/00* | (2022.01) | |
| *H04L 49/901* | (2022.01) | |

(52) U.S. Cl.
CPC .......... *G06F 3/0641* (2013.01); *G06F 3/0649* (2013.01); *G06F 3/0664* (2013.01); *G06F 3/0665* (2013.01); *G06F 9/455* (2013.01); *G06F 9/4552* (2013.01); *G06F 9/45554* (2013.01); *G06F 9/45558* (2013.01); *G06F 13/4282* (2013.01); *G06F 16/116* (2019.01); *G06F 16/1824* (2019.01); *G06F 16/1827* (2019.01); *H04L 49/10* (2013.01); *H04L 49/253* (2013.01); *H04L 49/70* (2013.01); *H04L 49/90* (2013.01); *H04L 49/901* (2013.01); *H04L 67/12* (2013.01); *H04L 69/16* (2013.01); *H04L 69/26* (2013.01); *G06F 2009/45579* (2013.01); *G06F 2009/45595* (2013.01); *G06F 2213/0026* (2013.01)

(58) Field of Classification Search
USPC ........................................................ 709/250
See application file for complete search history.

(56) References Cited

U.S. PATENT DOCUMENTS

| | | | |
|---|---|---|---|
| 5,887,134 A | 3/1999 | Ebrahim | |
| 5,974,547 A | 10/1999 | Klimenko | |
| 6,219,699 B1 | 4/2001 | McCloghrie et al. | |
| 6,496,935 B1 | 12/2002 | Fink et al. | |
| 7,079,544 B2 | 7/2006 | Wakayama et al. | |
| 7,424,710 B1 | 9/2008 | Nelson et al. | |
| 7,606,260 B2 | 10/2009 | Oguchi et al. | |
| 7,849,168 B2 | 12/2010 | Utsunomiya et al. | |
| 8,442,059 B1 | 5/2013 | Iglesia et al. | |
| 8,660,129 B1 | 2/2014 | Brendel et al. | |
| 8,825,900 B1 | 9/2014 | Gross et al. | |
| 8,856,518 B2 | 10/2014 | Sridharan et al. | |
| 8,931,047 B2 | 1/2015 | Wanser et al. | |
| 9,008,085 B2 | 4/2015 | Kamble et al. | |
| 9,116,727 B2 | 8/2015 | Benny et al. | |
| 9,135,044 B2 | 9/2015 | Maharana | |
| 9,143,582 B2 | 9/2015 | Banavalikar et al. | |
| 9,152,593 B2 | 10/2015 | Galles | |
| 9,154,327 B1 | 10/2015 | Marino et al. | |
| 9,197,551 B2 | 11/2015 | DeCusatis et al. | |
| 9,231,849 B2 | 1/2016 | Hyoudou et al. | |
| 9,378,161 B1 | 6/2016 | Dalal et al. | |
| 9,419,897 B2 | 8/2016 | Cherian et al. | |
| 9,460,031 B1 | 10/2016 | Dalal et al. | |
| 9,692,698 B2 | 6/2017 | Cherian et al. | |
| 10,142,127 B2 | 11/2018 | Cherian et al. | |
| 10,162,793 B1 | 12/2018 | BShara et al. | |
| 10,193,771 B2 | 1/2019 | Koponen et al. | |
| 10,567,308 B1 | 2/2020 | Subbiah et al. | |
| 10,997,106 B1 | 5/2021 | Bandaru et al. | |
| 11,108,593 B2 | 8/2021 | Cherian et al. | |
| 11,221,972 B1* | 1/2022 | Raman .................... H04L 67/60 | |
| 11,385,981 B1 | 7/2022 | Silakov et al. | |
| 2002/0069245 A1 | 6/2002 | Kim | |
| 2003/0130833 A1* | 7/2003 | Brownell ............. H04L 69/329 | 703/23 |
| 2003/0140124 A1 | 7/2003 | Burns | |
| 2003/0145114 A1* | 7/2003 | Gertner ................... G06F 3/067 | 711/149 |
| 2003/0200290 A1 | 10/2003 | Zimmerman et al. | |
| 2003/0217119 A1* | 11/2003 | Raman ................... H04L 69/329 | 709/219 |
| 2005/0053079 A1 | 3/2005 | Havala | |
| 2006/0029056 A1 | 2/2006 | Perera et al. | |
| 2006/0041894 A1 | 2/2006 | Cheng et al. | |
| 2006/0206603 A1* | 9/2006 | Rajan .................. H04L 67/1097 | 709/223 |
| 2006/0206655 A1 | 9/2006 | Chappell et al. | |
| 2006/0236054 A1* | 10/2006 | Kitamura ............. G06F 3/0617 | 711/165 |
| 2007/0174850 A1 | 7/2007 | Zur | |
| 2008/0008202 A1 | 1/2008 | Terrell et al. | |
| 2008/0267177 A1 | 10/2008 | Johnson et al. | |
| 2009/0089537 A1 | 4/2009 | Vick et al. | |
| 2009/0119087 A1* | 5/2009 | Ang ...................... G06F 9/45558 | 703/23 |
| 2009/0161547 A1 | 6/2009 | Riddle et al. | |
| 2009/0161673 A1 | 6/2009 | Breslau et al. | |
| 2010/0070677 A1 | 3/2010 | Thakkar | |
| 2010/0115208 A1* | 5/2010 | Logan .................... G06F 3/0611 | 711/147 |
| 2010/0165874 A1 | 7/2010 | Brown et al. | |
| 2010/0275199 A1 | 10/2010 | Smith et al. | |
| 2010/0287306 A1* | 11/2010 | Matsuda ............. H04L 67/1097 | 709/242 |
| 2011/0060859 A1 | 3/2011 | Shukla et al. | |
| 2011/0219170 A1* | 9/2011 | Frost ....................... G06F 3/068 | 711/E12.001 |
| 2012/0042138 A1* | 2/2012 | Eguchi .................. G06F 3/0635 | 711/E12.001 |
| 2012/0072909 A1 | 3/2012 | Malik et al. | |
| 2012/0079478 A1 | 3/2012 | Galles et al. | |
| 2012/0163388 A1 | 6/2012 | Goel et al. | |
| 2012/0167082 A1 | 6/2012 | Kumar et al. | |
| 2012/0259953 A1* | 10/2012 | Gertner .................. G06F 3/067 | 709/217 |
| 2012/0278584 A1* | 11/2012 | Nagami ................ G06F 3/0644 | 711/170 |
| 2012/0320918 A1 | 12/2012 | Fomin et al. | |
| 2013/0033993 A1 | 2/2013 | Cardona et al. | |
| 2013/0058346 A1 | 3/2013 | Sridharan et al. | |
| 2013/0061047 A1 | 3/2013 | Sridharan et al. | |
| 2013/0073702 A1* | 3/2013 | Umbehocker ....... H04L 41/0806 | 709/222 |
| 2013/0125122 A1* | 5/2013 | Hansen ................ G06F 16/188 | 718/1 |
| 2013/0145106 A1 | 6/2013 | Kan | |
| 2013/0311663 A1 | 11/2013 | Kamath et al. | |
| 2013/0318219 A1 | 11/2013 | Kancherla | |
| 2013/0318268 A1 | 11/2013 | Dalal et al. | |
| 2014/0003442 A1 | 1/2014 | Hernandez et al. | |
| 2014/0056151 A1 | 2/2014 | Petrus et al. | |
| 2014/0067763 A1 | 3/2014 | Jorapurkar et al. | |
| 2014/0074799 A1 | 3/2014 | Karampur et al. | |
| 2014/0098815 A1 | 4/2014 | Mishra et al. | |
| 2014/0115578 A1 | 4/2014 | Cooper et al. | |
| 2014/0123211 A1 | 5/2014 | Wanser et al. | |
| 2014/0208075 A1 | 7/2014 | McCormick, Jr. | |
| 2014/0215036 A1 | 7/2014 | Elzur | |
| 2014/0244983 A1 | 8/2014 | McDonald et al. | |
| 2014/0269712 A1 | 9/2014 | Kidambi | |
| 2014/0269754 A1 | 9/2014 | Eguchi et al. | |
| 2015/0007317 A1 | 1/2015 | Jain | |

(56) References Cited

U.S. PATENT DOCUMENTS

| | | |
|---|---|---|
| 2015/0016300 A1 | 1/2015 | Devireddy et al. |
| 2015/0019748 A1 | 1/2015 | Gross, IV et al. |
| 2015/0052280 A1 | 2/2015 | Lawson |
| 2015/0156250 A1 | 6/2015 | Varshney et al. |
| 2015/0172183 A1 | 6/2015 | DeCusatis et al. |
| 2015/0200808 A1* | 7/2015 | Gourlay .............. H04L 63/0876 709/225 |
| 2015/0212892 A1 | 7/2015 | Li et al. |
| 2015/0215207 A1 | 7/2015 | Qin et al. |
| 2015/0222547 A1 | 8/2015 | Hayut et al. |
| 2015/0242134 A1 | 8/2015 | Takada et al. |
| 2015/0261556 A1 | 9/2015 | Jain et al. |
| 2015/0261720 A1* | 9/2015 | Kagan .................... G06F 13/287 709/212 |
| 2015/0347231 A1* | 12/2015 | Gopal .................. H03M 13/159 714/764 |
| 2015/0358288 A1 | 12/2015 | Jain et al. |
| 2015/0358290 A1 | 12/2015 | Jain et al. |
| 2015/0381494 A1 | 12/2015 | Cherian et al. |
| 2015/0381495 A1 | 12/2015 | Cherian et al. |
| 2016/0006696 A1 | 1/2016 | Donley et al. |
| 2016/0092108 A1* | 3/2016 | Karaje .................... G06F 3/067 718/103 |
| 2016/0134702 A1* | 5/2016 | Gertner ................. G06F 3/0635 709/216 |
| 2016/0162302 A1 | 6/2016 | Warszawski et al. |
| 2016/0162438 A1 | 6/2016 | Hussain et al. |
| 2016/0179579 A1 | 6/2016 | Amann et al. |
| 2016/0182342 A1 | 6/2016 | Singaravelu et al. |
| 2016/0306648 A1 | 10/2016 | Deguillard et al. |
| 2017/0024334 A1 | 1/2017 | Bergsten et al. |
| 2017/0075845 A1 | 3/2017 | Kopparthi |
| 2017/0093623 A1 | 3/2017 | Zheng |
| 2017/0099532 A1 | 4/2017 | Kakande |
| 2017/0161090 A1 | 6/2017 | Kodama |
| 2017/0161189 A1* | 6/2017 | Gertner ................. H04L 67/568 |
| 2017/0214549 A1 | 7/2017 | Koshino et al. |
| 2017/0295033 A1 | 10/2017 | Cherian et al. |
| 2018/0024964 A1 | 1/2018 | Mao et al. |
| 2018/0032249 A1* | 2/2018 | Makhervaks ........... G06F 3/061 |
| 2018/0088978 A1 | 3/2018 | Li et al. |
| 2018/0095872 A1 | 4/2018 | Dreier et al. |
| 2018/0109471 A1 | 4/2018 | Chang et al. |
| 2018/0152540 A1 | 5/2018 | Niell et al. |
| 2018/0260125 A1* | 9/2018 | Botes ..................... G06F 3/065 |
| 2018/0262599 A1 | 9/2018 | Firestone |
| 2018/0278684 A1* | 9/2018 | Rashid .................... H04L 67/00 |
| 2018/0309641 A1 | 10/2018 | Wang et al. |
| 2018/0309718 A1 | 10/2018 | Zuo |
| 2018/0329743 A1* | 11/2018 | Pope ................... G06F 11/0793 |
| 2018/0331976 A1* | 11/2018 | Pope ....................... H04L 69/22 |
| 2018/0336346 A1* | 11/2018 | Guenther ............... G06F 21/53 |
| 2018/0337991 A1* | 11/2018 | Kumar ............... H04L 41/0897 |
| 2018/0349037 A1* | 12/2018 | Zhao ..................... G06F 3/0611 |
| 2018/0359215 A1 | 12/2018 | Khare et al. |
| 2019/0042506 A1 | 2/2019 | Evey et al. |
| 2019/0044809 A1 | 2/2019 | Willis et al. |
| 2019/0044866 A1 | 2/2019 | Chilikin et al. |
| 2019/0075063 A1 | 3/2019 | McDonnell et al. |
| 2019/0132296 A1 | 5/2019 | Jiang et al. |
| 2019/0158396 A1 | 5/2019 | Yu et al. |
| 2019/0173689 A1 | 6/2019 | Cherian et al. |
| 2019/0200105 A1 | 6/2019 | Cheng et al. |
| 2019/0235909 A1 | 8/2019 | Jin et al. |
| 2019/0278675 A1* | 9/2019 | Bolkhovitin ........ G06F 11/1088 |
| 2019/0280980 A1 | 9/2019 | Hyoudou |
| 2019/0286373 A1* | 9/2019 | Karumbunathan ..... G06F 3/065 |
| 2019/0306083 A1 | 10/2019 | Shih et al. |
| 2020/0028800 A1 | 1/2020 | Strathman et al. |
| 2020/0042234 A1 | 2/2020 | Krasner et al. |
| 2020/0042389 A1* | 2/2020 | Kulkarni ................ G06F 3/0689 |
| 2020/0042412 A1* | 2/2020 | Kulkarni .............. H04L 67/1093 |
| 2020/0136996 A1* | 4/2020 | Li ........................ H04L 45/745 |
| 2020/0259731 A1 | 8/2020 | Sivaraman et al. |
| 2020/0278892 A1 | 9/2020 | Nainar et al. |
| 2020/0278893 A1 | 9/2020 | Niell et al. |
| 2020/0319812 A1 | 10/2020 | He et al. |
| 2020/0328192 A1* | 10/2020 | Zaman ................. H01L 25/0657 |
| 2020/0382329 A1* | 12/2020 | Yuan ....................... G06F 13/28 |
| 2020/0401320 A1* | 12/2020 | Pyati ...................... G06F 11/16 |
| 2020/0412659 A1 | 12/2020 | Ilitzky et al. |
| 2021/0019270 A1 | 1/2021 | Li et al. |
| 2021/0026670 A1* | 1/2021 | Krivenok ............. H04L 67/1097 |
| 2021/0058342 A1* | 2/2021 | McBrearty .......... H04L 67/1097 |
| 2021/0232528 A1 | 7/2021 | Kutch et al. |
| 2021/0266259 A1 | 8/2021 | Renner, III et al. |
| 2021/0314232 A1 | 10/2021 | Nainar et al. |
| 2021/0357242 A1 | 11/2021 | Ballard et al. |
| 2021/0377166 A1 | 12/2021 | Brar et al. |
| 2021/0377188 A1 | 12/2021 | Ghag et al. |
| 2021/0392017 A1 | 12/2021 | Cherian et al. |
| 2021/0409317 A1 | 12/2021 | Seshan et al. |
| 2022/0043572 A1 | 2/2022 | Said et al. |
| 2022/0100432 A1 | 3/2022 | Kim et al. |
| 2022/0100491 A1 | 3/2022 | Voltz et al. |
| 2022/0100542 A1 | 3/2022 | Voltz |
| 2022/0100544 A1 | 3/2022 | Voltz |
| 2022/0100545 A1 | 3/2022 | Cherian et al. |
| 2022/0100546 A1 | 3/2022 | Cherian et al. |
| 2022/0103478 A1 | 3/2022 | Ang et al. |
| 2022/0103487 A1 | 3/2022 | Ang et al. |
| 2022/0103488 A1 | 3/2022 | Wang et al. |
| 2022/0103629 A1 | 3/2022 | Cherian et al. |
| 2022/0150055 A1 | 5/2022 | Cui et al. |
| 2022/0164451 A1 | 5/2022 | Bagwell |
| 2022/0197681 A1 | 6/2022 | Rajagopal |
| 2022/0206908 A1 | 6/2022 | Brar et al. |
| 2022/0206962 A1 | 6/2022 | Kim et al. |
| 2022/0206964 A1 | 6/2022 | Kim et al. |
| 2022/0210229 A1 | 6/2022 | Maddukuri et al. |
| 2022/0231968 A1 | 7/2022 | Rajagopal |
| 2022/0272039 A1 | 8/2022 | Cardona et al. |
| 2022/0335563 A1 | 10/2022 | Elzur |
| 2023/0004508 A1 | 1/2023 | Liu et al. |

FOREIGN PATENT DOCUMENTS

| | | | | |
|---|---|---|---|---|
| CN | 101258725 A | * | 9/2008 | ............ H04L 47/10 |
| CN | 101540826 A | * | 9/2009 | |
| DE | 102018004046 A1 | * | 11/2018 | ............. G06F 3/067 |
| EP | 1482711 A2 | * | 12/2004 | ............. H04L 12/28 |
| EP | E P-1482711 A2 | * | 12/2004 | ............. H04L 12/28 |
| EP | 3598291 A1 | * | 1/2020 | ........... G06F 3/0604 |
| TW | 202107297 A | * | 2/2021 | ............. A63F 13/35 |
| WO | WO-2005099201 A2 | * | 10/2005 | ............. H04L 29/06 |
| WO | 2007036372 A1 | | 4/2007 | |
| WO | WO-2010008984 A2 | * | 1/2010 | ......... G06F 12/0868 |
| WO | 2016003489 A1 | | 1/2016 | |
| WO | WO-2020027913 A1 | * | 2/2020 | .......... G06F 11/0727 |
| WO | 2021030020 A1 | | 2/2021 | |
| WO | 2022066267 A1 | | 3/2022 | |
| WO | 2022066268 A1 | | 3/2022 | |
| WO | 2022066270 A1 | | 3/2022 | |
| WO | 2022066271 A1 | | 3/2022 | |
| WO | 2022066531 A1 | | 3/2022 | |

OTHER PUBLICATIONS

Non-Published Commonly Owned U.S. Appl. No. 17/461,908, filed Aug. 30, 2021, 60 pages, Nicira, Inc.

Anwer, Muhammad Bilal, et al., "Building a Fast, Virtualized Data Plane with Programmable Hardware," Aug. 17, 2009, 8 pages, VISA'09, ACM, Barcelona, Spain.

Author Unknown, "Network Functions Virtualisation; Infrastructure Architecture; Architecture of the Hypervisor Domain," Draft ETSI GS NFV-INF 004 V0.3.1, May 28, 2014, 50 pages, France.

Koponen, Teemu, et al., "Network Virtualization in Multi-tenant Datacenters," Technical Report TR-2013-001E, Aug. 2013, 22 pages, VMware, Inc., Palo Alto, CA, USA.

Le Vasseur, Joshua, et al., "Standardized but Flexible I/O for Self-Virtualizing Devices," Month Unknown 2008, 7 pages.

(56) References Cited

OTHER PUBLICATIONS

Non-Published Commonly Owned U.S. Appl. No. 17/091,663 (G806), filed Nov. 6, 2020, 29 pages, VMware, Inc.
Non-Published Commonly Owned U.S. Appl. No. 17/107,561, filed Nov. 30, 2020, 39 pages, VMware, Inc.
Non-Published Commonly Owned U.S. Appl. No. 17/107,568, filed Nov. 30, 2020, 39 pages, VMware, Inc.
Non-Published Commonly Owned U.S. Appl. No. 17/114,975, filed Dec. 8, 2020, 52 pages, VMware, Inc.
Non-Published Commonly Owned U.S. Appl. No. 17/114,994, filed Dec. 8, 2020, 51 pages, VMware, Inc.
Non-Published Commonly Owned Related U.S. Appl. No. 17/145,318 with similar specification, filed Jan. 9, 2021, 70 pages, VMware, Inc.
Non-Published Commonly Owned Related U.S. Appl. No. 17/145,319 with similar specification, filed Jan. 9, 2021, 70 pages, VMware, Inc.
Non-Published Commonly Owned U.S. Appl. No. 17/145,321, filed Jan. 9, 2021, 49 pages, VMware, Inc.
Non-Published Commonly Owned U.S. Appl. No. 17/145,322, filed Jan. 9, 2021, 49 pages, VMware, Inc.
Non-Published Commonly Owned U.S. Appl. No. 17/145,329, filed Jan. 9, 2021, 50 pages, VMware, Inc.
Non-Published Commonly Owned U.S. Appl. No. 17/145,334, filed Jan. 9, 2021, 49 pages, VMware, Inc.
Peterson, Larry L., et al., "OS Support for General-Purpose Routers," Month Unknown 1999, 6 pages, Department of Computer Science, Princeton University.
Pettit, Justin, et al., "Virtual Switching in an Era of Advanced Edges," In Proc. 2nd Workshop on Data Center—Converged and Virtual Ethernet Switching (DCCAVES), Sep. 2010, 7 pages, vol. 22. ITC.
Spalink, Tammo, et al., "Building a Robust Software-Based Router Using Network Processors," Month Unknown 2001, 14 pages, ACM, Banff, Canada.
Turner, Jon, et al., "Supercharging PlanetLab—High Performance, Multi-Application Overlay Network Platform," SIGCOMM-07, Aug. 27-31, 2007, 12 pages, ACM, Koyoto, Japan.
Author Unknown, "8.6 Receive-Side Scaling (RSS)," Month Unknown 2020, 2 pages, Red Hat, Inc.
Herbert, Tom, et al., "Scaling in the Linux Networking Stack," Jun. 2, 2020, retrieved from https://01.org/linuxgraphics/gfx-docs/drm/networking/scaling.html.
Non-Published Commonly Owned U.S. Appl. No. 16/890,890 (F967), filed Jun. 2, 2020, 39 pages, VMware, Inc.
Stringer, Joe, et al., "OVS Hardware Offloads Discussion Panel," Nov. 7, 2016, 37 pages, retrieved from nttp://openvswitch.org/support/ovscon2016/7/1450-stringer.pdf.
Author Unknown, "An Introduction to SmartNICs" The Next Platform, Mar. 4, 2019, 4 pages, retrieved from https://www.nextplatform.com/2019/03/04/an-introduction-to-smartnics/.
Author Unknown, "In-Hardware Storage Virtualization—NVMe SNAP™ Revolutionizes Data Center Storage Composable Storage Made Simple," Month Unknown 2019, 3 pages, Mellanox Technologies, Sunnyvale, CA, USA.
Author Unknown, "Package Manager," Wikipedia, Sep. 8, 2020, 10 pages.
Author Unknown, "VMDK", Wikipedia, May 17, 2020, 3 pages, retrieved from https://en.wikipedia.org/w/index.php?title=VMDK&oldid=957225521.
Author Unknown, "vSphere Managed Inventory Objects," Aug. 3, 2020, 3 pages, retrieved from https://docs.vmware.com/en/VMware-vSphere/6.7/com.vmware.vsphere.vcenterhost.doc/GUID-4D4B3DF2-D033-4782-A030-3C3600DE5A7F.html, VMware, Inc.
Grant, Stewart, et al., "SmartNIC Performance Isolation with FairNIC: Programmable Networking for the Cloud," SIGCOMM '20, Aug. 10-14, 2020, 13 pages, ACM, Virtual Event, USA.
Liu, Ming, et al., "Offloading Distributed Applications onto SmartNICs using iPipe," SIGCOMM '19, Aug. 19-23, 2019, 16 pages, ACM, Beijing, China.
Suarez, Julio, "Reduce TCO with Arm Based SmartNICs," Nov. 14, 2019, 12 pages, retrieved from https://community.arm.com/arm-community-blogs/b/architectures-and-processors-blog/posts/reduce-tco-with-arm-based-smartnics.
Author Unknown, "vSAN Planning and Deployment" Update 3, Aug. 20, 2019, 85 pages, VMware, Inc., Palo Alto, CA, USA.
Author Unknown, "What is End-to-End Encryption and How does it Work?," Mar. 7, 2018, 4 pages, Proton Technologies AG, Geneva, Switzerland.
Harris, Jim, "Accelerating NVME-oF* for VMs with the Storage Performance Development Kit," Flash Memory Summit, Aug. 2017, 18 pages, Intel Corporation, Santa Clara, CA.
Perlroth, Nicole, "What is End-to-End Encryption? Another Bull's-Eye on Big Tech," The New York Times, Nov. 19, 2019, 4 pages, retrieved from https://nytimes.com/2019/11/19/technology/end-to-end-encryption.html.
PCT International Search Report and Written Opinion of Commonly Owned International Patent Application PCT/US2021/042120, dated Nov. 2, 2021, 10 pages. International Searching Authority (EPO).
Angeles, Sara, "Cloud vs. Data Center: What's the difference?" Nov. 23, 2018, 1 page, retrieved from https://www.businessnewsdaily.com/4982-cloud-vs-data-center.html.
Author Unknown, "Middlebox," Wikipedia, Nov. 19, 2019, 1 page, Wikipedia.com.
Doyle, Lee, "An Introduction to smart NICs and their Benefits," Jul. 2019, 2 pages, retrieved from https://www.techtarget.com/searchnetworking/tip/An-introduction-to-smart-NICs-and-ther-benefits.

* cited by examiner

ACCESSING MULTIPLE EXTERNAL STORAGES TO PRESENT AN EMULATED LOCAL STORAGE THROUGH A NIC

BACKGROUND

In recent years, there has been an increase in the use of hardware offload units to assist functions performed by programs executing on host computers. Examples of such hardware offload units include FGPAs, GPUs, smart NICs, etc. Such hardware offload units have improved performance and efficiency requirements of the host computers by offloading some of the operations that are typically performed by the host computer CPU to the hardware offload unit.

BRIEF SUMMARY

Some embodiments of the invention provide a method of providing distributed storage services to a host computer from a network interface card (NIC) of the host computer. At the NIC, the method accesses a set of one or more external storages operating outside of the host computer through a shared port of the NIC that is not only used to access the set of external storages but also for forwarding packets not related to the set of external storages or the distributed storage service. In some embodiments, the method accesses the external storage set by using a network fabric storage driver that employs a network fabric storage protocol to access the external storage set.

The method in some embodiments presents the external storage as a local storage of the host computer to a set of one or more programs executing on the host computer. In some embodiments, the local storage is a virtual disk, while the set of programs are a set of machines (e.g., virtual machines or containers) executing on the host computer. In some embodiments, the method presents the local storage by using a storage emulation layer (e.g., a virtual disk layer) on the NIC to create a local storage construct. In some embodiments, the emulated local storage (e.g., the virtual disk) does not represent any storage on the NIC, while in other embodiments, the emulated local storage also represents one or more storages on the NIC.

The method forwards read/write (R/W) requests to the set of external storages when receiving R/W requests from the set of programs to the virtual disk, and provides responses to the R/W requests after receiving responses from the set of external storages to the forwarded read/write requests. In some embodiments, the method translates the R/W requests from a first format for the local storage to a second format for the set of external storages before forwarding the requests to the external storage through the network fabric storage driver. The method also translates responses to these requests from the second format to the first format before providing the responses to an NIC interface of the host computer in order to provide these responses to the set of programs.

In some embodiments, the NIC interface is a PCIe (peripheral component interconnect express) interface, and the first format is an NVMe (non-volatile memory express) format. The second format in some of these embodiments is an NVMeOF (NVME over fabric) format and the network fabric storage driver is an NVMeOF driver. In other embodiments, the second format is a remote DSAN (distributed storage area network) format and the network fabric storage driver is a remote DSAN driver. The NIC in some embodiments includes a general purpose central processing unit (CPU) and a memory that stores a program (e.g., an NIC operating system) for execution by the CPU to access the set of external storages and to present the set of external storages as a local storage. In some embodiments, the NIC also includes an application specific integrated circuit (ASIC), which processes packets forwarded to and from the host computer, with at least a portion of this processing including the translation of the R/W requests and responses to these requests. The ASIC in some embodiments is a hardware offload unit of the NIC.

In addition to providing an emulation layer that creates and presents an emulated local storage to the set of programs on the host, the method of some embodiments has the NIC execute a DSAN service for the local storage to improve its operation and provide additional features for this storage. One example of a DSAN service is the vSAN service offered by VMware, Inc. The features of the DSAN service in some embodiments include (1) data efficiency processes, such as deduplication operations, compression operations, and thin provisioning, (2) security processes, such as end-to-end encryption, and access control operations, (3) data and life cycle management, such as storage vMotion, snapshot operations, snapshot schedules, cloning, disaster recovery, backup, long term storage, (4) performance optimizing operations, such as QoS policies (e.g., max and/or min I/O regulating policies), and (5) analytic operations, such as collecting performance metrics and usage data for virtual disk (10, latency, etc.).

These services are highly advantageous for improving performance, resiliency and security of the host's storage access that is facilitated through the NIC. For instance, the set of host programs that access the emulated local storage do not have insight that data is being accessed on remote storages through network communications. Neither these programs nor other programs executing on the host in some embodiments encrypt their storage access, as the storage being accessed appears to be local to these programs. Hence, it is highly beneficial to use the DSAN services for the R/W requests and responses (e.g., its security processes to encrypt the R/W requests and responses) exchanged between the host and the set of external storages that are made to appear as the local storage.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings and the Claims is needed. Moreover, the claimed subject matters are not to be limited by the illustrative details in the Summary, Detailed Description and the Drawing.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

Figure 1:
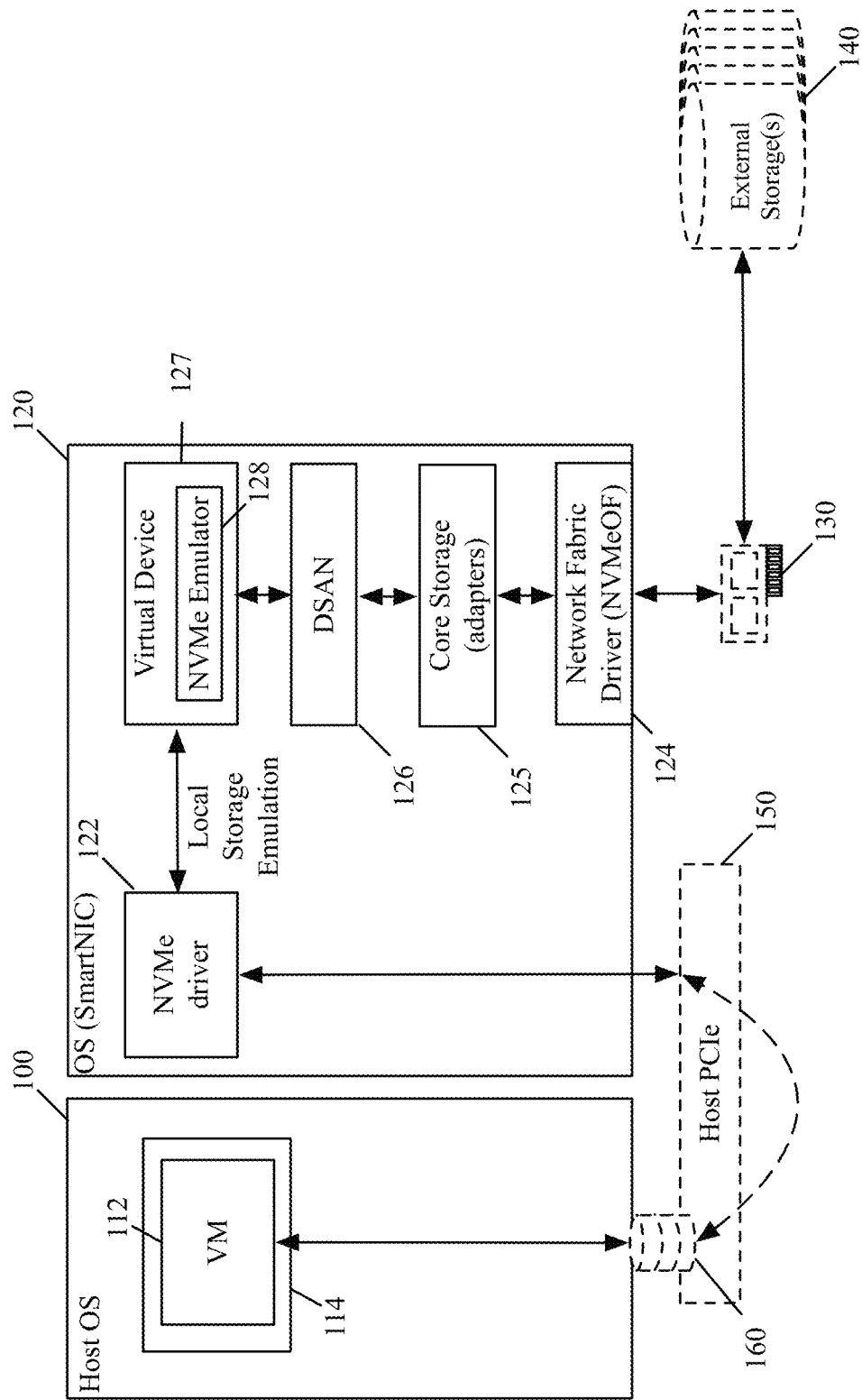
FIG. 1 illustrates one manner of using a smart NIC to emulate a local storage that represents several external storages to a virtual machine executing over a hypervisor of a host computer.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a method of providing distributed storage services to a host computer from a network interface card (NIC) of the host computer. At the NIC, the method accesses a set of one or more external storages operating outside of the host computer through a shared port of the NIC that is not only used to access the set of external storages but also for forwarding packets not related to the set of external storages or the distributed storage service. The NICs are sometimes referred to herein as smart NICs as they perform multiple types of services and operations. In some embodiments, the method accesses the external storage set by using a network fabric storage driver that employs a network fabric storage protocol (e.g., NVMeOF) to access the external storage set.

The method presents the external storage as a local storage of the host computer to a set of programs executing on the host computer. In some embodiments, the local storage is a virtual disk, while the set of programs are a set of machines (e.g., virtual machines or containers) executing on the host computer. In some embodiments, the method presents the local storage by using a storage emulation layer (e.g., a virtual disk layer) to create a local storage construct that presents the set of external storages as a local storage of the host computer. In some embodiments, the emulated local storage (e.g., the virtual disk) does not represent any storage on the NIC, while in other embodiments, the emulated local storage also represents one or more storages on the NIC.

The method forwards read/write (R/W) requests to the set of external storages when receiving R/W requests from the set of programs to the virtual disk, and provides responses to the R/W requests after receiving responses from the set of external storages to the forwarded read/write requests. In some embodiments, the method translates the R/W requests from a first format for the local storage to a second format for the set of external storages before forwarding the requests to the external storage through the network fabric storage driver. The method also translates responses to these requests from the second format to the first format before providing the responses to a NIC interface of the host computer in order to provide these responses to the set of programs.

In some embodiments, the NIC interface is a PCIe interface, and the first format is an NVMe format. The second format in some of these embodiments is an NVMeOF format and the network fabric storage driver is an NVMeOF driver. The NIC in some embodiments includes a general purpose central processing unit (CPU) and a memory that stores a program (e.g., an NIC operating system) for execution by the CPU to access the set of external storages and to present the set of external storages as a local storage. The NIC in some embodiments is implemented as a system on chip (SoC) with multiple other circuit components. For instance, in some embodiments, the NIC also includes an application specific integrated circuit (ASIC), which processes packets forwarded to and from the host computer, with at least a portion of this processing including the translation of the R/W requests and responses to these requests. This ASIC in some embodiments is a hardware offload unit (HOU) of the NIC, and performs special operations (e.g., packet processing operations, response/request reformatting operations, etc.).

In addition to providing an emulation layer that creates and presents an emulated local storage to the set of programs on the host, the method of some embodiments has the NIC execute a distributed storage area network (DSAN) service for the local storage to improve its operation and provide additional features for this storage. One example of a DSAN service is the vSAN service offered by VMware, Inc.

The DSAN services are highly advantageous for improving performance, resiliency and security of the host's storage access that is facilitated through the NIC. For instance, the set of host programs that accesses the emulated local storage does not have insight that data is being accessed on remote storages through network communications. Neither these programs nor other programs executing on the host in some embodiments encrypt their storage access, as the storage being accessed appears to be local to these programs. Hence, it is highly beneficial to use the DSAN services for the R/W requests and responses (e.g., its security processes to encrypt the R/W requests and responses) exchanged between the host and the set of external storages that are made to appear as the local storage.

Although the description of some embodiments refers to emulations of NVMe storage and NVMe storage protocol, in other embodiments other storage protocols may be emulated instead of or in addition to NVMe storages. Similarly, although the description refers to PCIe buses, in other embodiments, other system buses are used instead of or in addition to a PCIe bus. Although certain drivers and protocols are shown as being used by external storages in various embodiments, other embodiments use other drivers or protocols for external storage. The smart NICs described herein are described as having operating software. In some embodiments, this operating software is an operating system that has direct control over the smart NIC without an intervening program or hypervisor. In other embodiments, the operating software is a hypervisor that runs on top of another operating system of the smart NIC. Still other embodiments use just a hypervisor and no other operating system on the smart NIC.

FIG. 1 illustrates one manner of using a smart NIC to emulate a local storage 160 that represents several external storages 140 to one or more virtual machines 112 executing over the operating system (OS) 100 of a host computer. One example of such a machine is illustrated as a virtual machine (VM) 112, which operates over a hypervisor 114 executing on the host OS 100. The host computer has a set of processors that execute its OS, hypervisor and VM. This computer also includes a smart NIC that has a set of processors and a set of hardware offload units that assist in the operation of the host computer. Specifically, in addition to performing traditional NIC operations to forward packets to and from the host computer (e.g., between the machines executing on the host computer and machines executing on other host computers), the smart NIC performs storage emulation operations that represent multiple external storages 140 as the local storage 160 to the machines executing on the host computer. The smart NIC connects to PCIe bus 150 of the host.

The smart NIC in some embodiments is a system on chip (SoC) with a CPU, FPGA, memory, IO controller, a physical NIC, and other hardware components. The smart NIC has an operating system (OS) 120 that includes an NVMe driver 122 and a series of storage processing layers 124-127. The discussion below collectively refers to the software executing on the smart NIC as the smart NIC OS 120. However, in some embodiments, the smart NIC OS is a hypervisor, while in other embodiments a hypervisor executes on top of the smart NIC OS and some or all of the storage processing layers are part of this hypervisor. In the discussion below, the components that are attributed to the smart NIC OS 120 are components of the hypervisor 114 that serves as the smart NIC OS or executes on top of the smart NIC OS in some embodiments. In other embodiments, these are components of a smart NIC OS that is not a hypervisor. In still other embodiments, some of these components belong to the smart NIC OS, while other components belong to the hypervisor executing on the smart NIC OS.

The NVMe driver 122 is a driver for the PCIe bus 150. This driver relays NVMe formatted R/W requests from the host hypervisor 114 to the storage processing layers, and relays responses to these requests from the storage processing layers to the host hypervisor 114. The storage processing layers include an NVMeOF driver 124, a core storage service 125, a DSAN service 126, and a virtual device service 127. The virtual device service includes an NVMe emulator 128.

The smart NIC OS 120 uses the NVMeOF driver 124 in some embodiments to access one or more external storages 140. Specifically, the smart NIC OS 120 emulates a local NVMe storage 160 to represent several external storages 140 to the machines (e.g., VM 112) executing on the host. From the host point of view, the VM 112 operates on the emulated local storage 160 as if it was a local NVMe storage connected through the PCIe bus 150.

To access the external storages 140, the smart NIC (e.g., the NVMeOF driver) uses one or more of its shared ports 130. The shared ports are not only used for the purposes of accessing external storage 140, but are also used for other purposes as well (e.g., used to forward packets to and from destinations other than the external storages). The NVMeOF driver 124 handles the NVMeOF protocols needed for communicating with the external storages 140 through network fabric (e.g., through routers).

The smart NICs illustrated in FIG. 1 as well as in other figures perform operations other than storage emulation. For instance, the smart NICs perform regular packet processing in order to forward packets to and from other destinations outside of the smart NIC's host computer that are not external storages. Examples of such other destinations include machines executing on other host computers. However, the illustration presented in FIG. 1 and the other figures focus on the components of the smart NIC that facilitate the storage emulation operations in order not to obscure the description of some embodiments with unnecessary detail.

Figure 2:
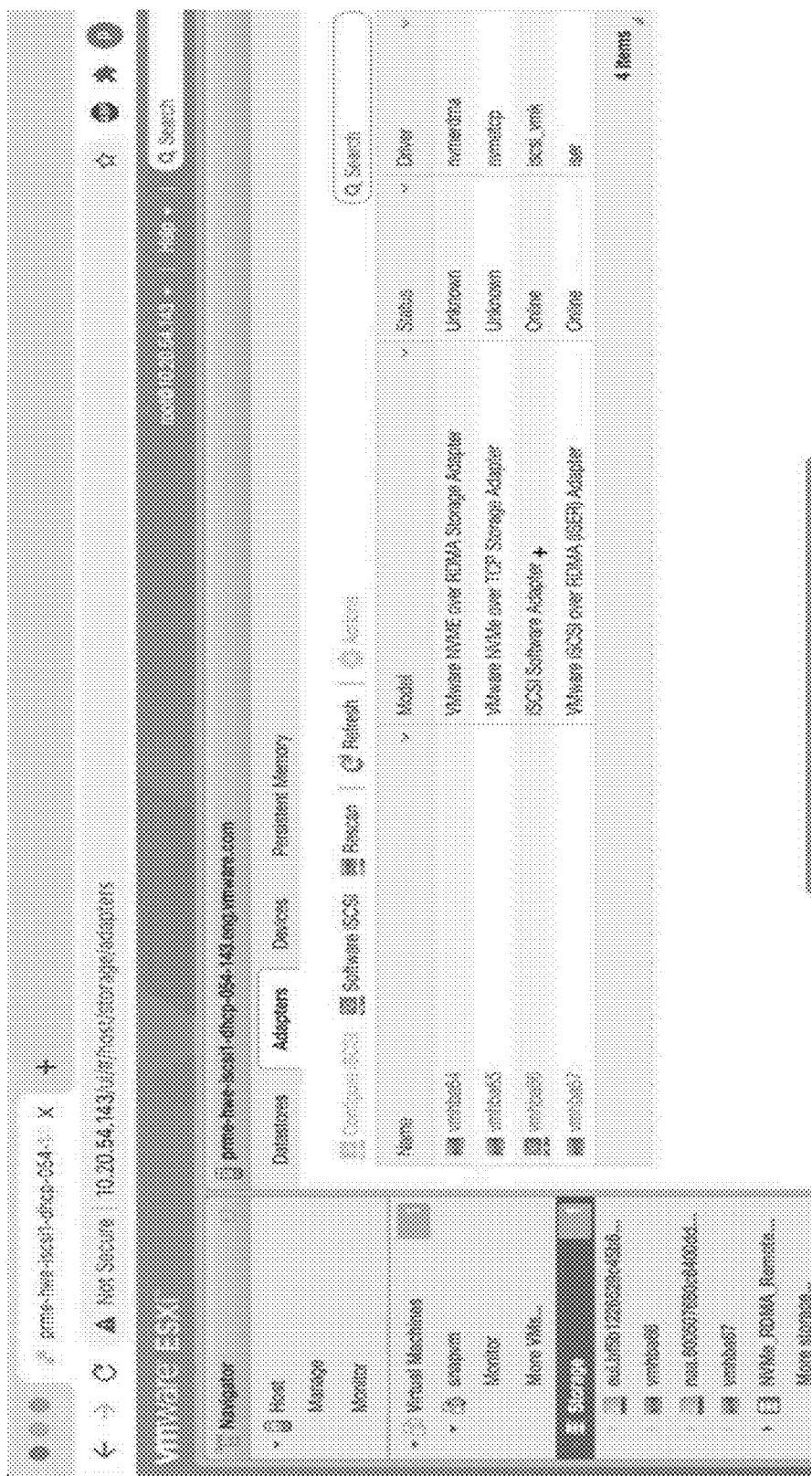
FIG. 2 illustrates examples of adapters emulated by the smart NIC.

The core storage service 125 provides one or more core storage operations. One example of such operations are adapter services that allow the smart NIC to emulate one or more storage adapters, with each adapter logically connecting to one or more external storages 140 and facilitating a different communication mechanism (e.g., transport mechanism) for communicating with the external storages. FIG. 2 illustrates examples of such adapters. In this example, four adapters are illustrated. These include an RDMA storage adapter, a TCP storage adapter, an iSCSI adapter, and an iSER adapter.

Through this interface, an administrator in some embodiments can specify one or more adapters to use to access an external storage, or a set of two or more external storages. In some embodiments, more than one adapter is specified for an external storage when the administrator wants to specify a multipath pluggable storage architecture (PSA) approach to accessing the storage. Once the administrator specifies an adapter, a network manager that provides the interface sends the definition of the specified adapter to a network controller, which then configures the smart NIC to implement and configure a new driver, or reconfigure an existing driver, to access the external storage according to the adapter's specified definition. Different methods for configuring a smart NIC in some embodiments are described below.

The DSAN service 126 provides one or more DSAN operations to improve the operation of the emulated local storage 160 and provide additional features for this storage. These operations are performed as the emulated local storage is not really local but rather an emulation of one or more external storages. As such, the DSAN service 126 addresses one or more things that can go wrong in accessing such a virtual "local" storage.

For instance, in some embodiments, the DSAN service provides data resiliency and I/O control that are not generally needed when a host machine is accessing a physical local storage over NVMe. A local drive is not subject to interception over a network and is not prone to packet duplication in the manner of packets sent over a network. These issues arise from emulating the local storage using external storage accessed over a network, therefore the DSAN layer 126 resolves such issues before the data is presented to the higher layers.

In some embodiments, the DSAN operations include (1) data efficiency processes, such as deduplication operations, compression operations, and thin provisioning. (2) security processes, such as end-to-end encryption, and access control operations, (3) data and life cycle management, such as storage vMotion, snapshot operations, snapshot schedules, cloning, disaster recovery, backup, long term storage, (4) performance optimizing operations, such as QoS policies (e.g., max and/or min I/O regulating policies), and (5) analytic operations, such as collecting performance metrics and usage data for virtual disk (10, latency, etc.).

One example of a DSAN service 126 is the vSAN service offered by VMware, Inc. In some such embodiments, the smart NIC includes a local physical storage that can serve as a vSAN storage node. In other embodiments, the smart NIC does not have a local physical storage, or has such a storage but this data storage cannot participate as a vSAN storage node. In such embodiments, the smart NIC serves as a remote vSAN client node, and its vSAN layer is a vSAN proxy that uses one or more remote vSAN nodes that perform some or all of the vSAN operations and then direct the vSAN proxy what to do.

Figure 3:
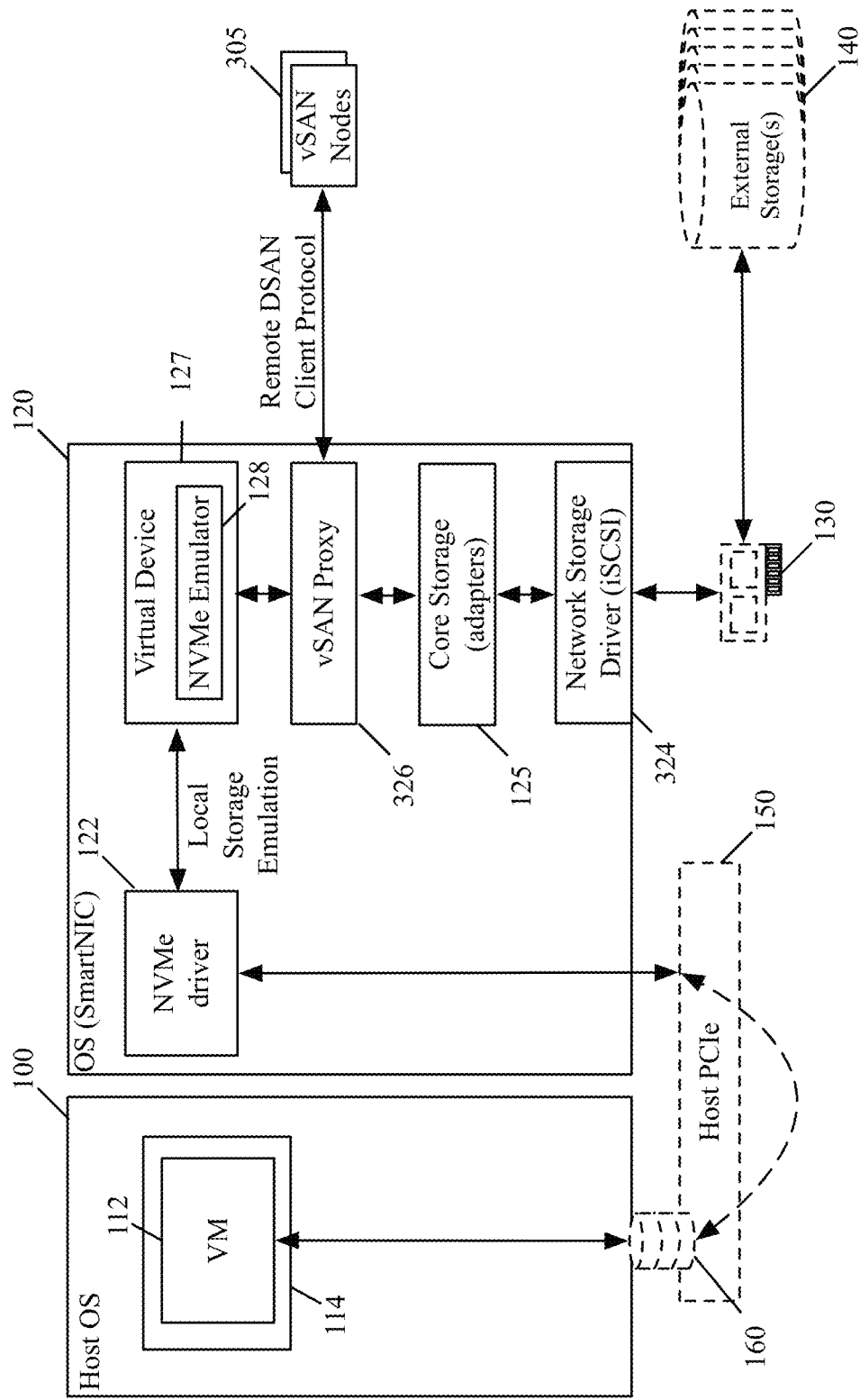
FIGS. 3 and 4 illustrate two different ways that a DSAN service on a smart NIC serves as a vSAN node in some embodiments.

FIG. 3 illustrates such an approach. As shown, the vSAN proxy 326 uses a remote vSAN client protocol to communicate with the other vSAN nodes 305, which direct the vSAN operations of the vSAN proxy. The vSAN nodes 305 provide some or all of the external storages 140 in some embodiments of the invention. In this example, the network storage driver 324 is an iSCSI driver, although other network storage drivers are used in other embodiments.

Figure 4:
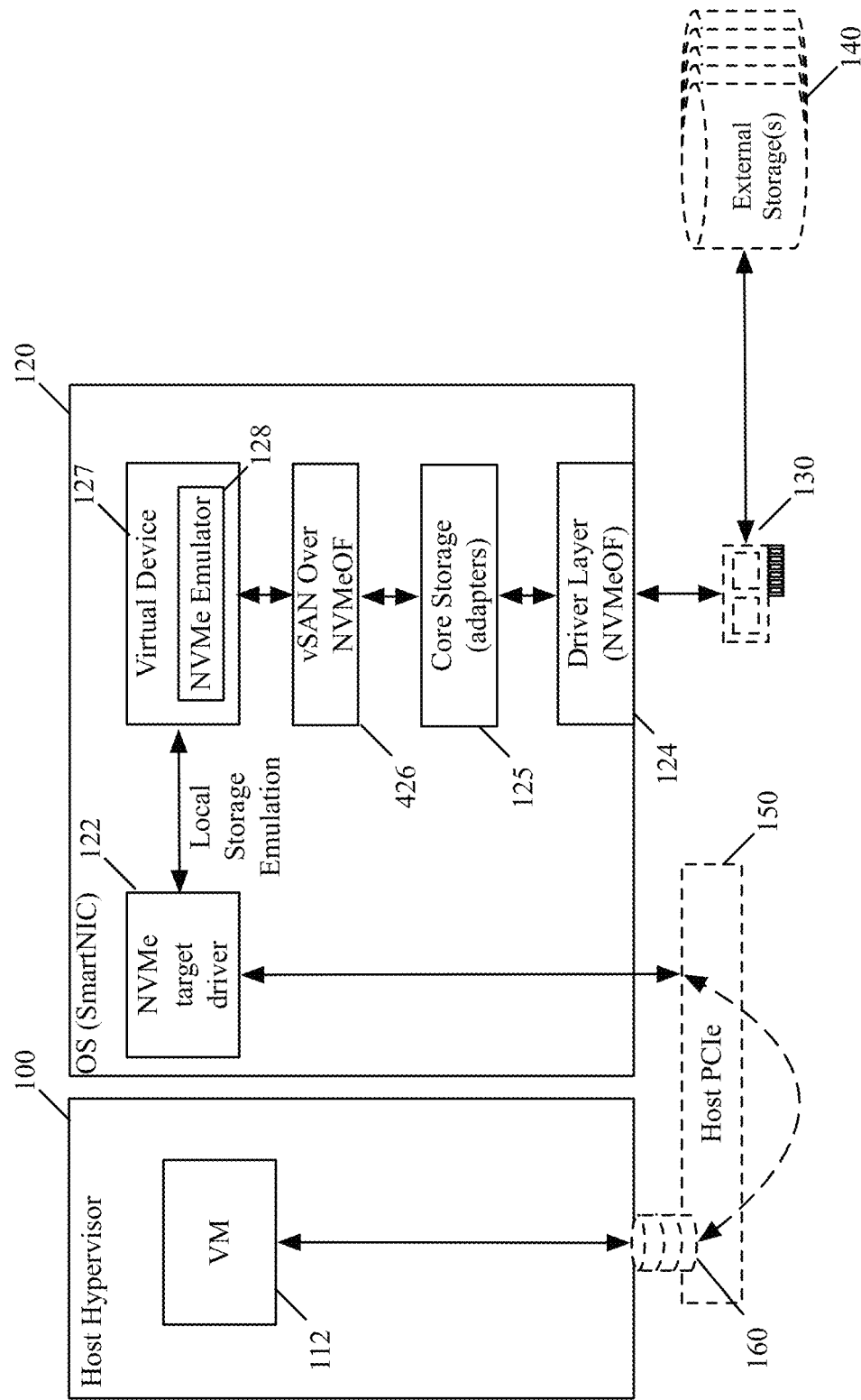

In other embodiments, the DSAN service of the smart NIC does not use a remote vSAN client protocol to communicate with the other vSAN nodes. For instance, as shown in FIG. 4, a DSAN service 126 in some embodiments uses a vSAN over NVMeOF protocol 426 to communicate with the other vSAN nodes. This protocol is defined in some embodiments to allow the smart NIC to be a vSAN node that does not have a local physical storage, or has such a storage but this data storage cannot participate as a vSAN storage node. In some embodiments, the emulated local storage 160 (that is defined by one or more external storages 140 through emulation operations of the NVMe emulator 128 of the virtual device service 127 of the smart NIC OS 120) serves as the local storage that allows the smart NIC to be a vSAN node.

The virtual device service 127 has an NVMe emulator 128 that emulates the local NVMe storage 160 to represent the set of external storages 140 that are accessed through the NVMeOF driver 124 and the intervening network. As part of this emulation, the virtual device layer 127 maps outgoing NVMe access commands to external storage access commands, and the incoming external storage responses to an NVMe memory response. When multiple external storages are used, this mapping involves mapping between a storage location in the emulated local storage 160 and a storage location in one or more external storages 140. One example of a virtual device emulator that can be used for the NVMe emulator is the virtual device emulator of the vSphere software of VMware, Inc.

Part of the NVMe emulator's operation also involves this emulator using the hardware offload unit (e.g., an ASIC) of the smart NIC to convert the NVMe access commands from an NVMe-PCIe format to an NVMe format, and to convert the external storage responses received at the emulator 128 from the NVMe format to an NVMe-PCIe format (e.g., to remove PCIe header information from outgoing commands, and to add PCIe header information to incoming responses). This is further described below by reference to FIGS. 5 and 6.

The host OS 100, the hypervisor 114 or the VM 112 in some embodiments have their own drivers (not shown) for sending and receiving data through the PCIe bus 150. The host OS 100, the hypervisor 114 or the VM 112 treats the virtual local storage 160 as a physical local storage, without having to deal with the operations that the smart NIC performs to send data to and receive data from the set of external storages 140.

DSAN services 126 (such as the remote DSAN client of FIG. 3 or the DSAN over NVMeOF of FIG. 4) are two ways of offering disaggregated storage services. Today, many DSANs (e.g., VMware's vSAN architecture) are part of a hyper-converged solution, in which each vSAN node offers both storage and compute functionality. As illustrated by FIGS. 3 and 4, disaggregated storage in some embodiments refers to storage in a system which has some DSAN nodes (e.g., some hardware boxes) that provide only compute functionality and no storage functionality. In some embodiments, one or more DSAN nodes only offer storage functionality and no compute functionality. Such a disaggregated system allows more flexibility in datacenters by allowing the operators of the datacenters to add more storage boxes than compute boxes or more compute boxes than storage boxes, whichever is necessary, rather than adding additional compute boxes with storages whenever additional capacity of only one of those resources is necessary.

Figure 5:
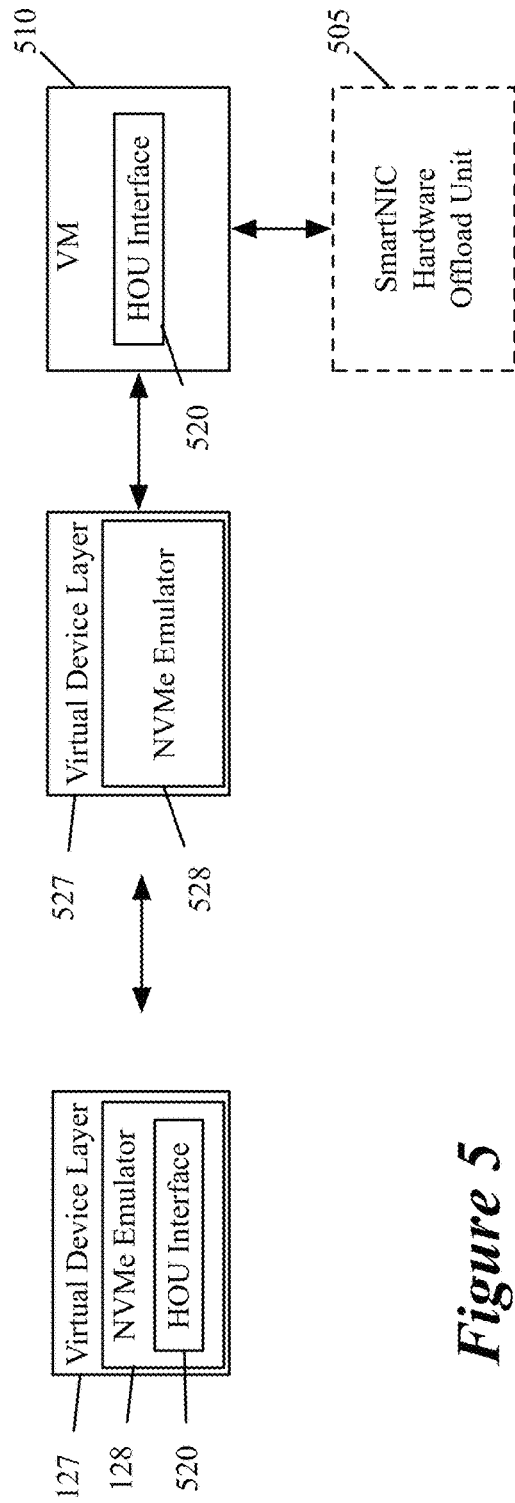
FIGS. 5 and 6 illustrate two different ways that the smart NIC of some embodiments uses to translate between the NVMe and NVMeOF storage formats.
Figure 6:
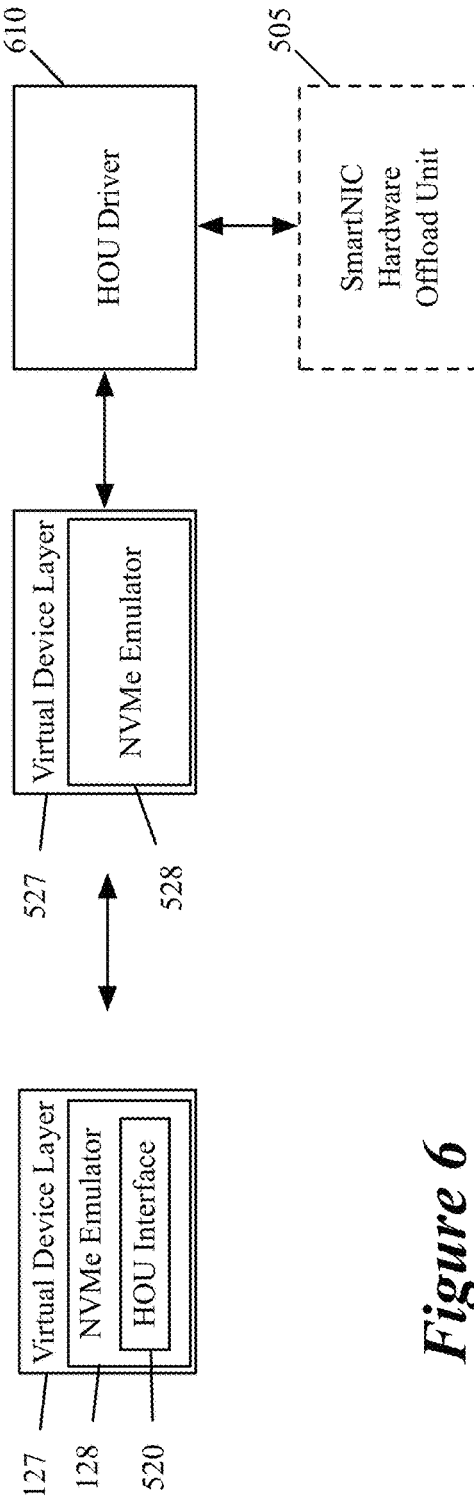

FIGS. 5 and 6 illustrate two different ways that the smart NIC of some embodiments uses to translate between the NVMe and NVMe-PCIe formats (e.g., to remove PCIe header from outgoing storage access commands and to add PCIe header information to incoming storage responses). Both of these techniques use a hardware offload unit (HOU) 505 of the smart NIC to perform these operations. This HOU is an ASIC that has multiple packet processing stages that can be configured to remove or add PCIe headers to storage commands and responses to and from the external storages. In both approaches illustrated in FIGS. 5 and 6, the NVMe emulator 128 uses an HOU interface 520 to communicate with the HOU 505.

In FIG. 5, the HOU interface executes on a VM 510 that executes on the smart NIC. The smart NIC OS is a hypervisor and the VM 510 executes on top of this hypervisor in some embodiments. As shown, the NVMe emulator 528 of the virtual device layer 527 communicates with the HOU interface 520 to forward storage access commands and responses for processing by the HOU 505 and to receive processed commands and responses from the HOU 505. In other embodiments, the smart NIC executes the HOU interface on machines (e.g., Pods or containers) other than VMs. One example of an HOU interface and the HOU are the Snap software and hardware offered by Nvidia, Inc. In some embodiments, the HOU Snap software operates on the VM as it requires a different OS (e.g., require Ubuntu) than the smart NIC OS (which might be ESX offered by VMware, Inc.).

In some embodiments, a smart NIC is able to employ HOU drivers that are adapted to the smart NIC OS (e.g., HOU drivers supplied along with the smart NIC operating software or subsequently downloaded, etc.) as the interface with the smart NIC HOU. The HOU drivers that are adapted to run directly on a particular type of operating software are referred to as being "native" to that operating software. In FIG. 6, the HOU interface 520 is implemented as a native HOU driver 610 of the smart NIC. This approach works when the driver is available natively for the smart NIC OS. Otherwise, the driver has to operate in a VM 510 as in FIG. 5.

Figure 7:
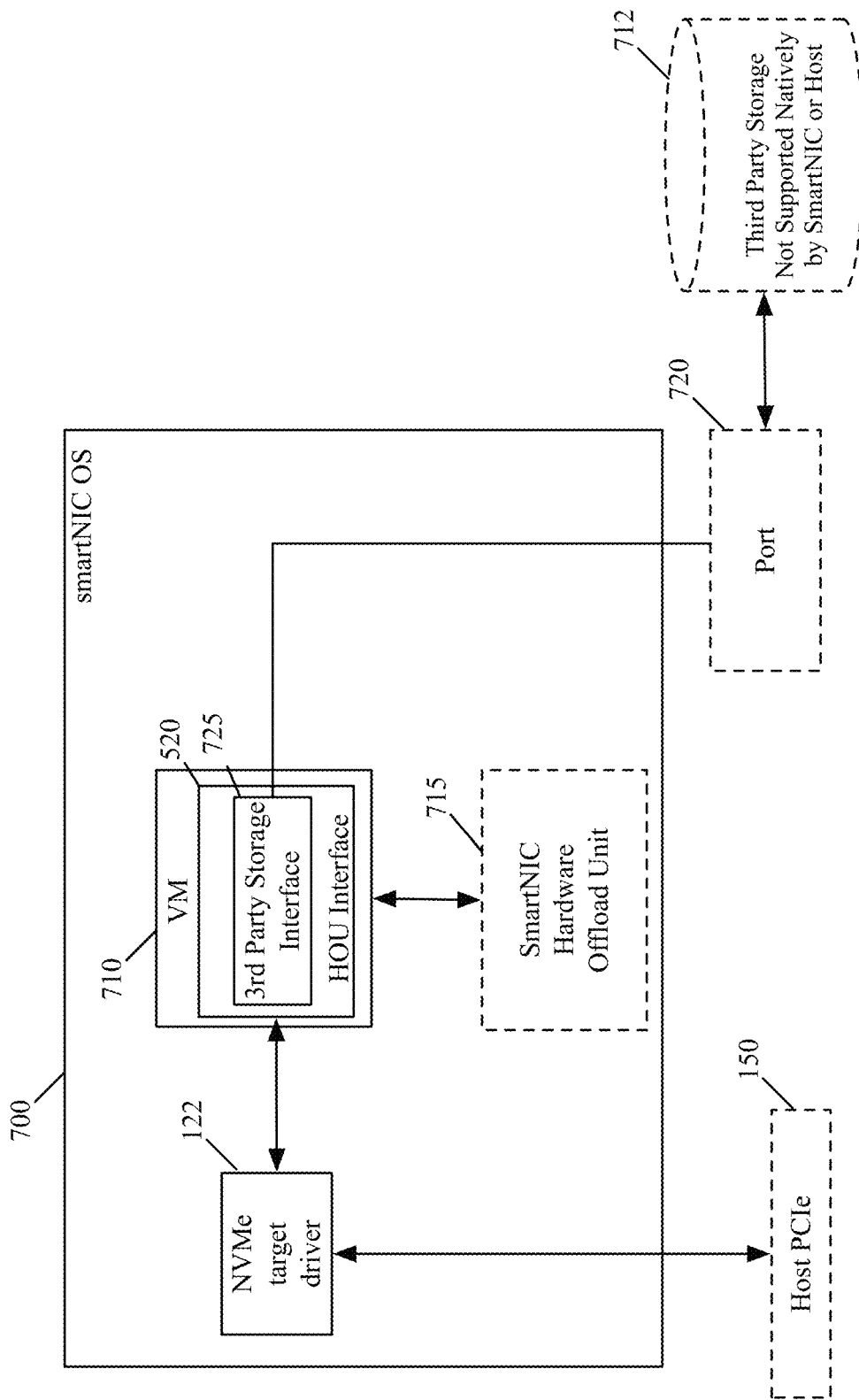
FIG. 7 illustrates a VM that executes on a smart NIC to implement third party interface (protocols) that are needed to access a third party external storage and that are not natively supported by the smart NIC or the host.

More generally, a VM is used by the smart NIC of some embodiments to perform other processes and/or support other protocols that are not natively supported by the smart NIC in some embodiments. For instance, FIG. 7 illustrates a VM 710 that executes on a smart NIC OS 700 to implement third party interface 725 (e.g., third party storage protocol) that is needed to access a third party external storage 712 and that is not natively provided by the smart NIC OS or the host OS. In this example, the third party storage interface 725 is part of an interface 520 for a HOU 715 of the smartNIC.

At the direction of the HOU interface 520 (also called the HOU handler), the HOU 715 performs storage command and response processing operations needed to implement the third party storage protocol and to convert between the command and response formats of the host's local storage (e.g., its NVMe local storage) and the third party external storage 712. As shown, the third party storage interface 725 passes storage access commands and receives storage access responses from a shared port 720 of the NIC.

Figure 8:
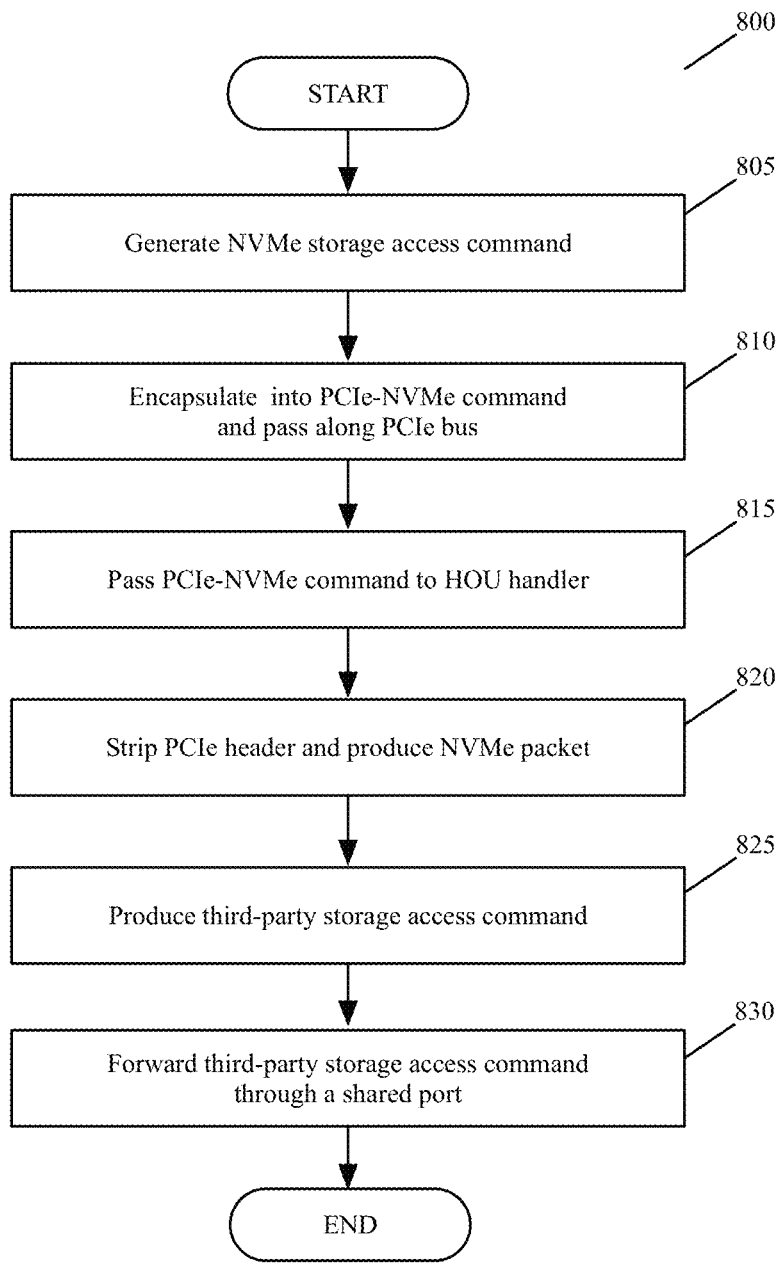
FIG. 8 illustrates a process that some embodiments perform to handle egress communication from the host to a third party external storage.

FIG. 8 illustrates a process 800 that some embodiments perform to handle egress communication from the host to a third party external storage. As shown, the process 800 starts (at 805) when a workload VM or an application running on the host generates an NVMe command (with data). At 810, the NVMe command is then encapsulated into a PCI-NVME command (i.e., encapsulated with a PCIe header) at a local storage controller of the host computer, and is forwarded along the PCIe bus to the smart NIC 700. At the smart NIC 700, the PCI-NVMe command is passed (at 815) to the HOU handler 520 running inside of the VM 710.

Next, at 820, the third party storage interface 725 strips off the PCI Headers and passes NVMe command back to the HOU handler 520. To do this, the third party storage interface 725 uses the HOU in some embodiments. The HOU handler next uses (at 825) the smart NIC HOU to change the format of the NVMe command to a command that comports with the third party storage 712, and passes (at 830) this command to the third party storage 712 along a shared port of the smart NIC. In some embodiments, the command is passed to the third party storage 712 as one or more packets transmitted through the network fabric.

Figure 9:
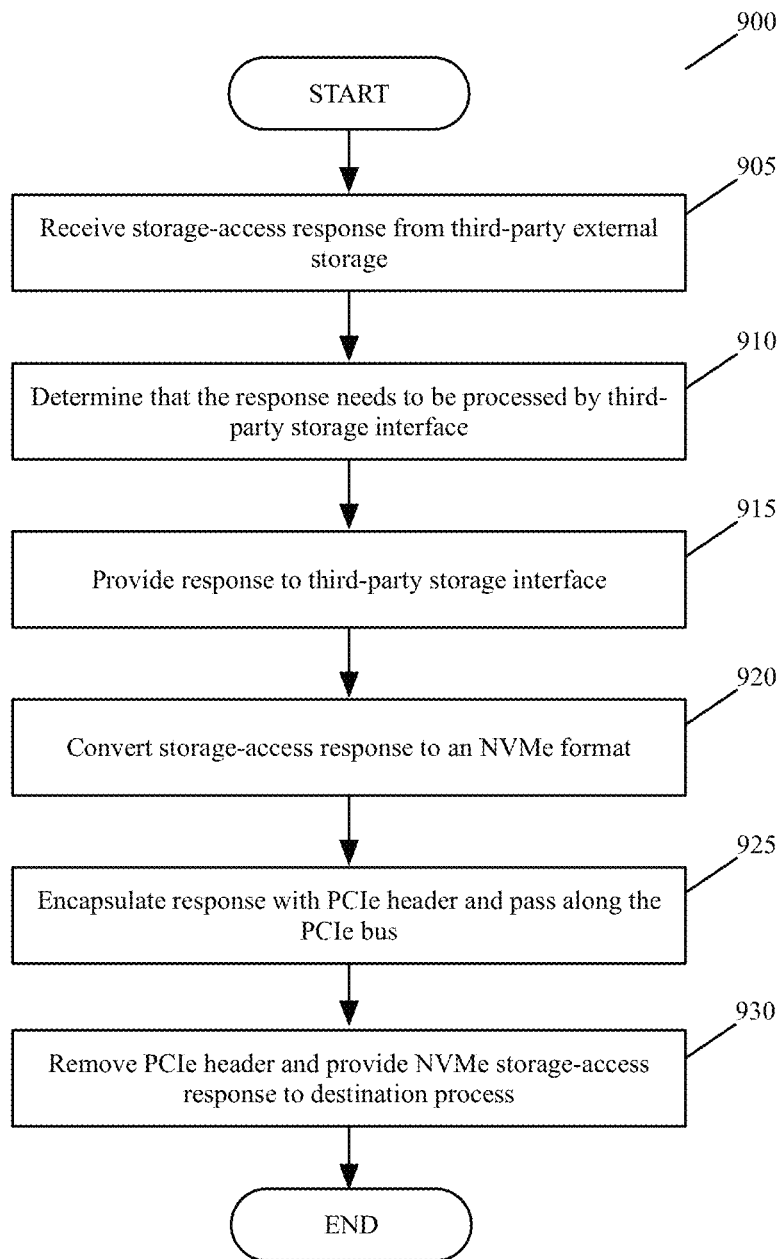
FIG. 9 illustrates a process that some embodiments perform to handle ingress communication from the third party external storage to the host.

FIG. 9 illustrates a process 900 that some embodiments perform to handle ingress communication from the third party external storage to the host. As shown, the process 900 starts (at 905) when it gets a storage-access response (e.g., a Read response) through a shared port of the NIC from the third party external storage 712. At 910, the smart NIC OS determines that the storage-access response is from a third party external storage that needs to be processed by the third party storage interface 725 of the HOU handler 520.

At 915, the HOU Interface 520 gets the storage-access response and provides it to the third party storage interface 725, which then converts (at 920) the storage-access response from a third party format to an NVMe format and passes the storage-access response back to the HOU interface 520. Next, at 925, the HOU interface encapsulates the NVMe storage-access response with a PCIe header, and is passed to the host's local storage controller along the PCIe bus 150. The local storage controller then removes (at 930) the PCIe header, and provides the NVMe storage-access response to a workload VM or an application running on the host.

As described with respect to FIG. 1, the smart NICs of some embodiments provide a DSAN service to perform various security and efficiency operations for the virtual local storage that is emulated with one or more external storages. However, the smart NIC in other embodiments bypasses the DSAN layer that performs DSAN operations in order to increase the speed of data transfer. Instead of the HOU drivers described above, some such embodiments use other protocols. For example, some embodiments use HOU upper level protocols (ULP). Upper level protocols (e.g., IPoIB, SRP, SDP, iSER, etc.) facilitate standard data networking, storage and file system applications to operate over InfiniBand.

Figure 10:
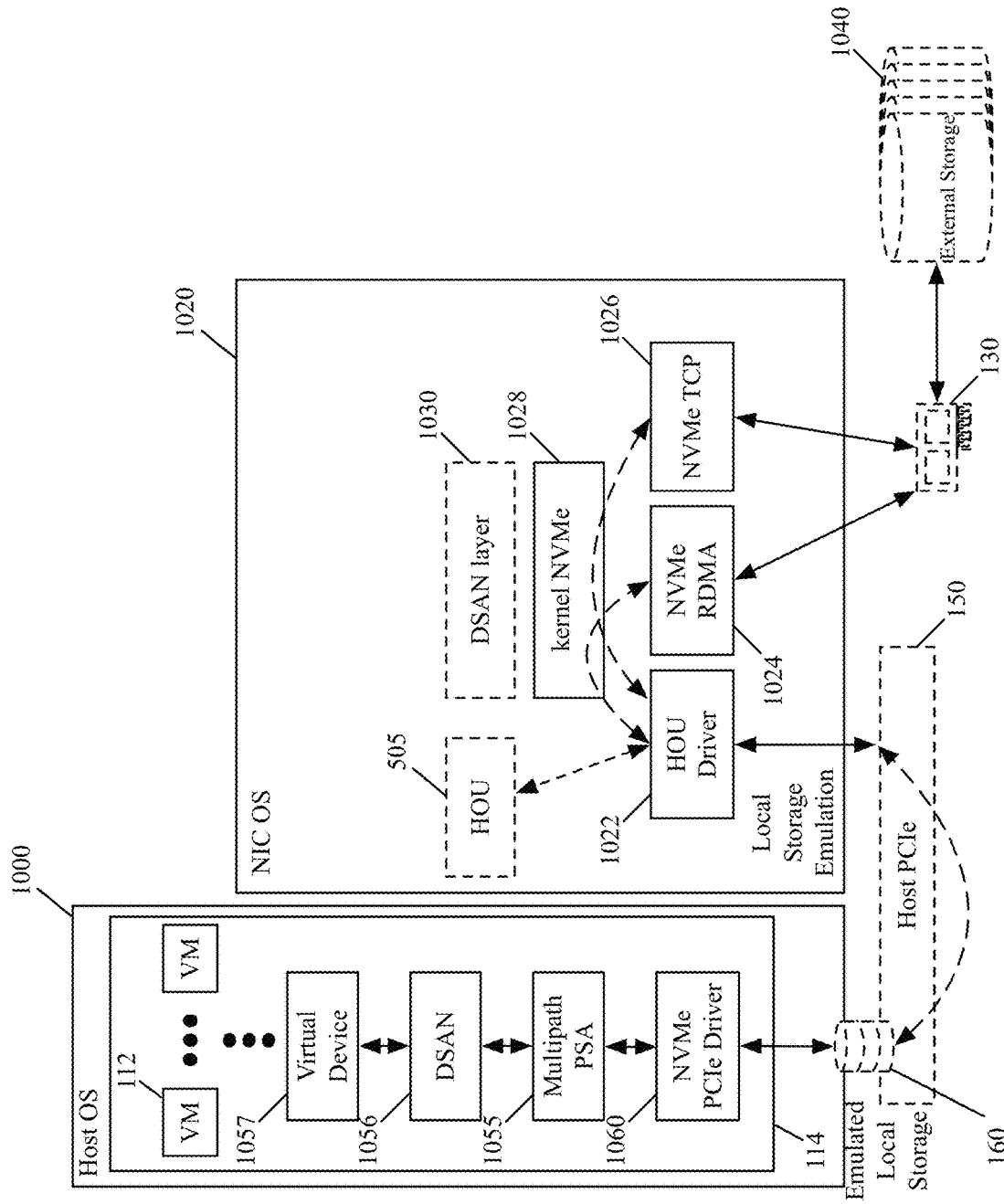
FIG. 10 illustrates a smart NIC emulating a local storage using an external storage and a hardware offload unit driver.

FIG. 10 illustrates a smart NIC emulating a local storage for the VMs 112 of a host 1000 by using an external storage 1040 and a HOU driver 1022. Like the above-described HOU interfaces and drivers, the HOU driver 1022 forwards data messages for processing by the smart NIC HOU 505 and receives processed data messages from the HOU 505. Specifically, the HOU driver 1022 uses the HOU 505 to perform the packet processing needed to convert between the data message NVMe formats and the NVMe PCIe formats. In this example, the HOU driver 1022 exchanges data messages with a kernel NVMe layer 1028, which exchanges data messages with an NVMe RDMA driver 1024 and/or an NVMe TCP driver 1026. The NVMe RDMA and TCP drivers send and receive data messages to and from external storage 1040 through an intervening network fabric (e.g., intervening routers and switches).

One advantage of the approach of FIG. 10 is that the smart NIC 1020 transfers data quickly between the host and the external storage 1040 that is used to emulate the host's local storage 1020. This transfer is fast because it uses the kernel NVMe 1028 as a bridge and it does not use a DSAN layer 1030 on the smart NIC OS 1020. This embodiment can tap into NVMe RDMA offload capability by using the NVMe RDMA driver 1024. In some embodiments, the HOU of the smart NIC 1020 can strip Ethernet headers from an incoming data packet, identify the particular NVMe PCIe controller (here, the HOU ULP driver 1022) that needs to receive the packet, and pass the packet to that NVMe PCIe controller. Thus, the smart NIC CPU cost of bridging through the kernel NVMe layer 1028 is minimal. This speed comes at a cost of other features, such as bypassing the DSAN service 1030 which provides useful security and performance operations for the emulated local storage.

In the example of FIG. 10, the DSAN module 1056, the virtual device emulator 1057 and the multipath PSA service 1055 are provided for one or more VMs 112 through the host hypervisor 114. Specifically, in this example, a multipath PSA layer 1055 exists between the VMs 112 executing on the host OS 1000 and the NVMe PCIe driver 1060 of the OS. Through this PSA layer 1055, the host can use multiple paths to the same external storage by using different NVMe PCIe drivers executing on the host OS 1000 (although only one NVMe PCIe driver 1060 is shown in FIG. 10). In other words, for the multi-pathing, different PCIe drivers are also used in some embodiments to access the same external storage through different paths. Also, in some embodiments, the different NVMe PCIe drivers are used to emulate different local storages from different external storages 1040.

The virtual device emulator 1057 is used to emulate a local virtual disk from several external storages 1040 for one or more VMs 112. As mentioned above, the vSphere software's virtual device layer is used to implement the virtual device emulator of the host hypervisor or smart NIC hypervisor in some embodiments. In some embodiments, the same or different PCIe drivers 1060 are used to access different external storages 1040 that are used to emulate one virtual disk. The DSAN module 1056 performs DSAN services like those described above for the emulated local storages.

In some embodiments, the host hypervisor and smart NIC hypervisor can be configured to provide different storage services for different workload VMs 112. For instance, the storage access commands and responses for one workload VM is processed by the storage services 1055-57, while the storage access commands and responses for another workload VM skip these storage services. Similarly, the storage access commands and responses of one workload VM is processed by the storage services 125-127 of the smart NIC as shown in FIG. 1, while the storage access commands and responses of another workload VM are just processed by the kernel NVMe module 1028 and NVMeOF drivers 1024 and 1026 of FIG. 10.

Figure 11:
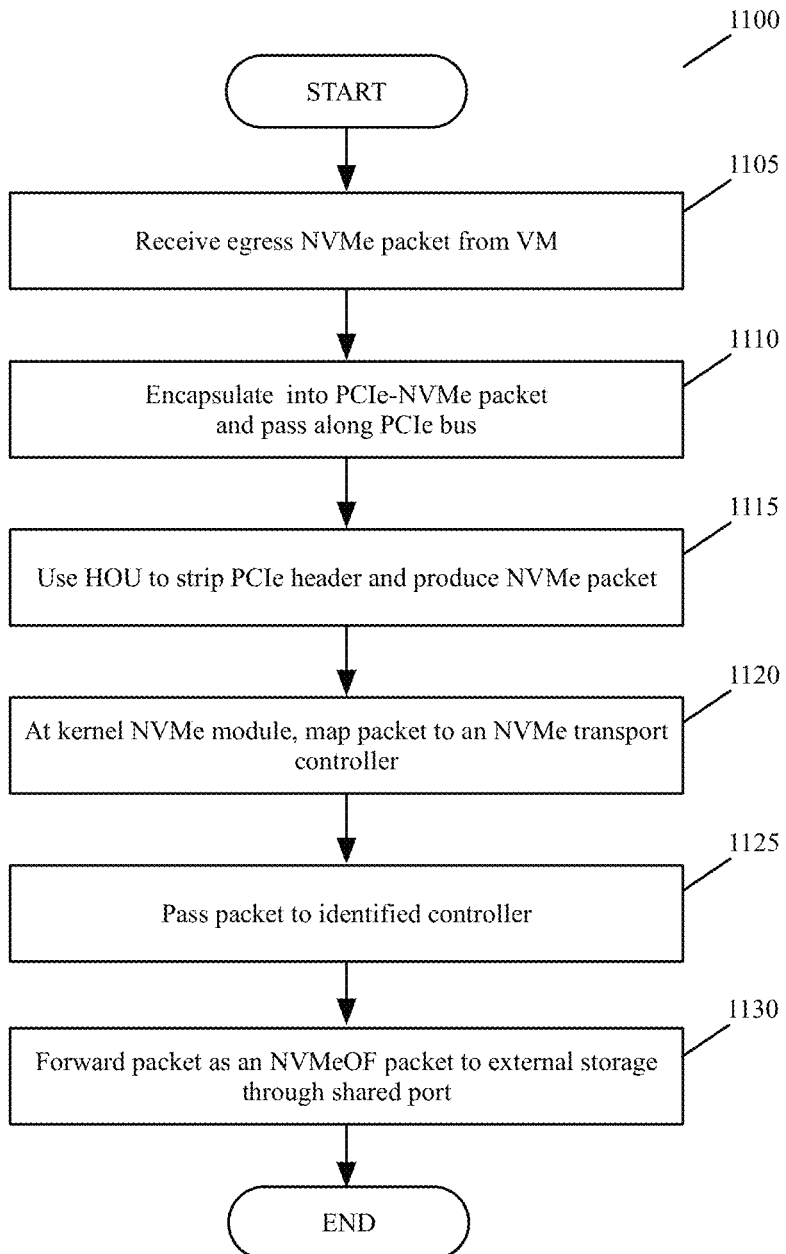
FIG. 11 illustrates a process that the smart NIC OS performs in some embodiments to process an egress communication from the host to an external storage for the example illustrated in FIG. 10.

FIG. 11 illustrates a process 1100 that the smart NIC OS 1020 performs in some embodiments to process an egress communication from the host to an external storage for the example illustrated in FIG. 10. As shown, the process starts (at 1105) when an NVMe command (with data) is generated by a VM 112 on the host. This packet (at 1110) is encapsulated with PCIe header information to produce a PCIe-NVMe command (with data) at a local storage controller (not shown) of the host, and is passed along to the PCIe bus 150. Next, at 1115, the HOU driver 1022 (e.g., HOU ULP driver) receives this command through the PCIe bus 150, and uses the HOU to strip out the PCI headers and produce the NVMe command (with data).

At 1120, the HOU driver 1022 passes the NVMe command to the kernel NVMe module 1028, which maps this packet to an NVMeOF transport controller. The kernel NVMe module 1028 in some embodiments is transport agnostic, and can be configured to use any one of a number of different NVMe transport drivers. At 1120, the kernel NVMe 1028 identifies the NVMeOF controller (i.e., NVMe RDMA controller 1024 or NVMe TCP controller 1026) that needs to receive this NVMe command. This identification is based on the NVMe command parameters that identify the transport protocol to use. These command parameters are provided by the host's multipath PSA layer 1055.

The kernel module (at 1125) passes the NVMe command to the identified NVMeOF controller, which then generates one or more NVMeOF packets to forward (at 1130) the NVMe command to the destination external storage through a shared port of the smart NIC. As mentioned above, both NVMe RDMA 1024 and NVMe TCP 1026 are provided by the smart NIC OS 1020 for accessing remote external storages 1040 through the shared port(s) 130 of the smart NIC. In some embodiments, the kernel NVMe 1028 works like a multiplexer that provides NVMe storage access to the HOU driver 1022 using different transports, such as NVMe RDMA 1024 and NVMe TCP 1026, at the same time. After 1130, the process 1100 ends.

Figure 12:
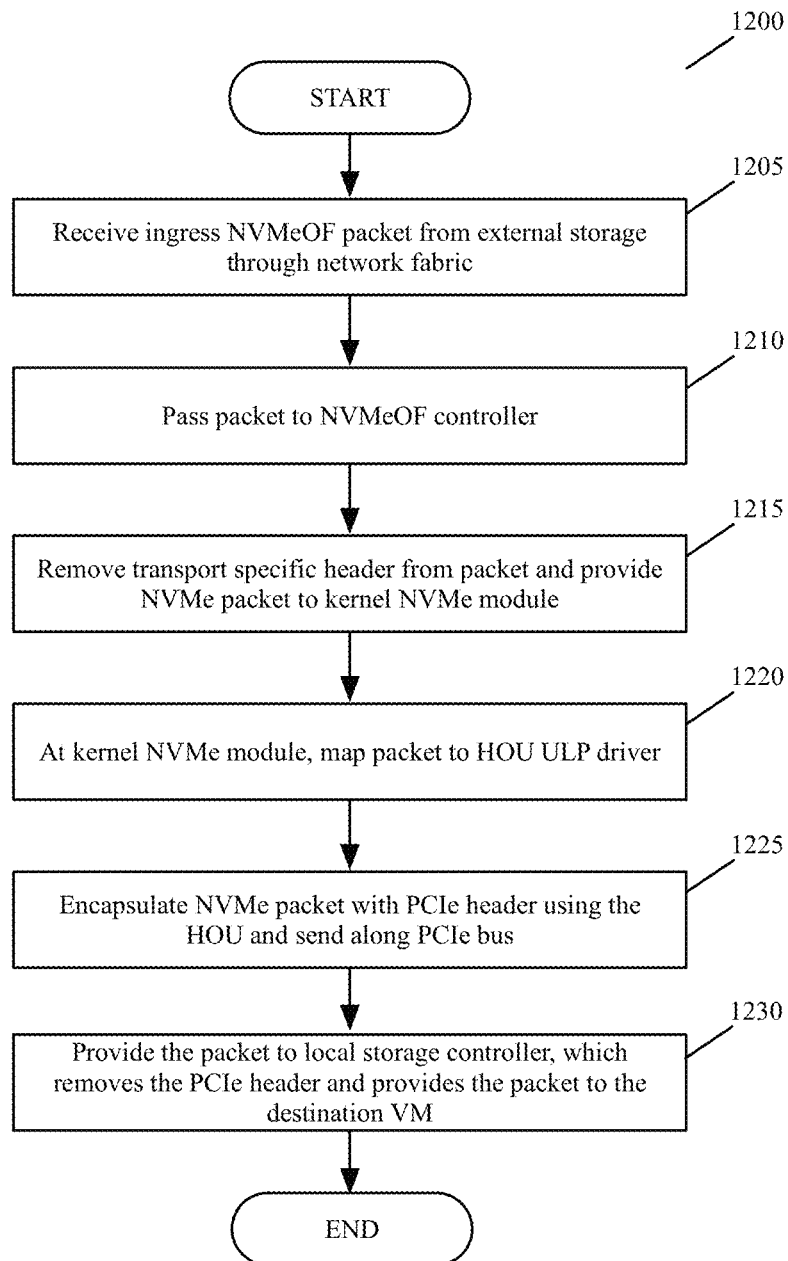
FIG. 12 illustrates a process that the smart NIC OS performs in some embodiments to process an ingress packet from an external storage to the host.

FIG. 12 illustrates a process 1200 that the smart NIC OS 1020 performs in some embodiments to process an ingress packet from an external storage to the host. As shown, the process starts (at 1205) when an external storage 1040 generates and forwards an NVMeOF command (with data) that is received as a set of one or more network packets at a shared port of the smart NIC through network fabric (e.g., through one or more switches and/or routers). The port (at 1210) passes the received packet to the NVMe RDMA controller 1024 or NVMe TCP controller 1026 depending on the transport protocol used by the external storage. The NVMe controller (at 1215) receives the NVMeOF packet in its transport specific format, removes the transport header data, and provides an NVMe command (with data) to the kernel NVMe 1028.

At 1220, the kernel NVMe 1028 maps the received NVMe command to the HOU driver 1022 as the NVMe command needs to go to host. In some embodiments, the kernel NVMe 1028 creates a record when it was processing an egress packet at 1125 and uses this record to perform its mapping at 1220. In some embodiments, the kernel NVMe 1028 provides the NVMe command to the HOU driver 1022 with the controller of the emulated local storage 160 as the command's destination. At 1225, the HOU driver 1022 then encapsulates the NVMe command with a PCIe header by using the smart NIC's HOU and then sends the NVMe command along the host PCIe to the local storage controller of the emulated local storage 160. The host PCIe then provides (at 1230) the NVMe command to the local storage controller through the NVMe PCIe driver 1060. This controller then removes (at 1230) the PCIe header and provides the NVMe command to the destination VM 112. The process 1200 then ends.

Figure 13:
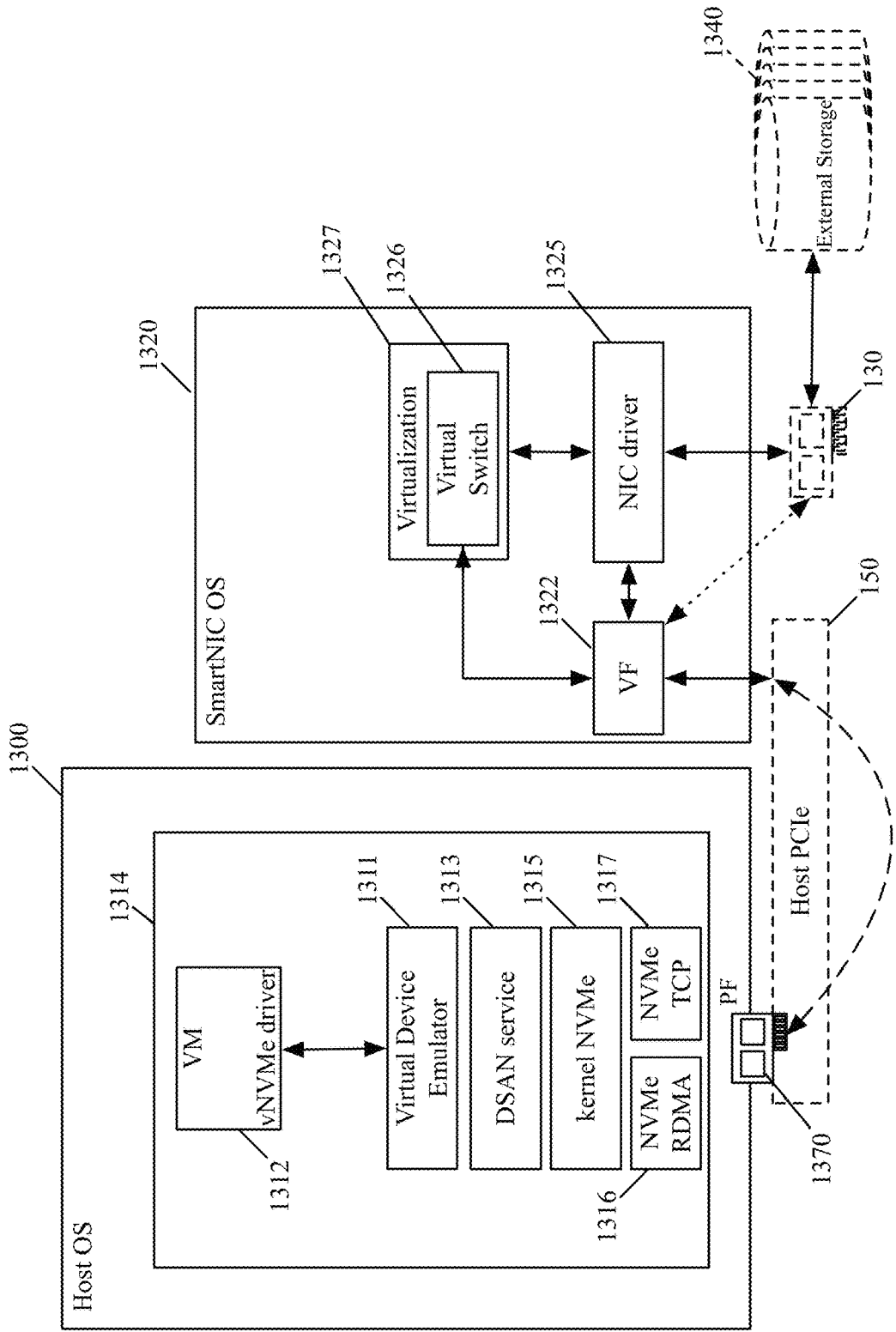
FIG. 13 illustrate one example of a smart NIC that is used with a host to perform storage emulation.
Figure 15:
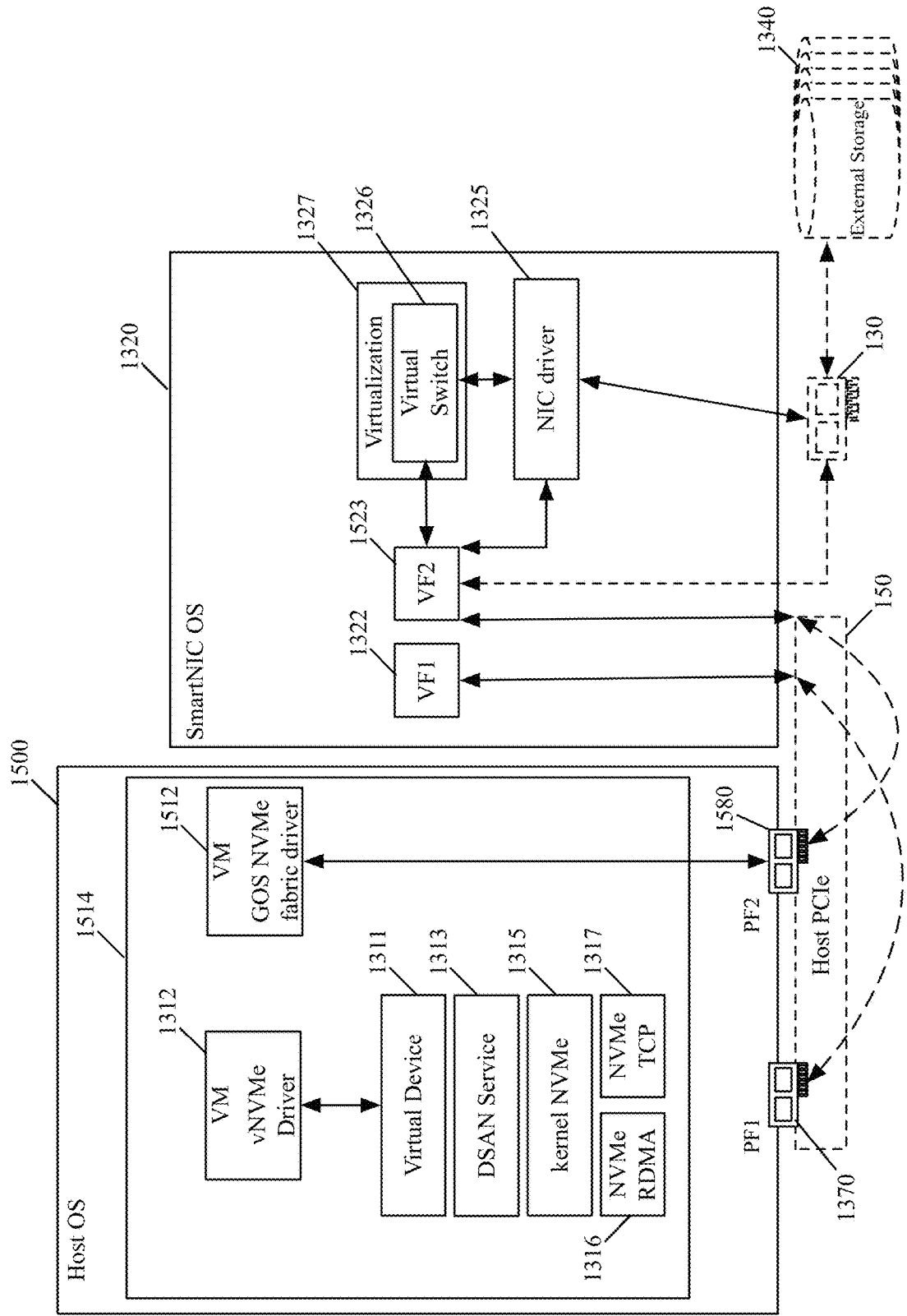
FIG. 15 illustrates another example of a smart NIC that is used with a host to perform storage emulation.

In some embodiments, the smart NICs are used as storage access accelerators. FIGS. 13 and 15 illustrate two such examples. FIG. 13 illustrates how a smart NIC serves as a network accelerator to one or more workload VMs 1312 executing over a host hypervisor 1314 that operates over a host OS 1300. In this example, the remote storage services protocol is running inside the host and the smart NIC OS 1320 just runs network accelerators. Also, the host hypervisor 1314 provides emulation services in this example that allow it to present one or more external storages 1340 as a local storage to a VM 1312. In some embodiments, the hypervisor 1314 is the ESX hypervisor of VMware, Inc. In some such embodiments, a virtual NVMe device emulation module 1311 of the VMware vSphere software provides the NVMe device emulation that presents multiple external storages 1340 as a single local NVMe storage to the VM 1312.

In some embodiments, the hypervisor 1314 also includes the DSAN service layer 1313, which provide distributed storage services for the emulated local NVMe storage. As mentioned above, the distributed storage services in some embodiments account for the VM 1312 having no knowledge regarding the plurality of external storages being used to emulate the local storage. These DSAN service improve this emulated storage's operation and provide additional features for it. Examples of such features in some embodiments include (1) data efficiency processes, such as deduplication operations, compression operations, and thin provisioning, (2) security processes, such as end-to-end encryption, and access control operations, (3) data and life cycle management, such as storage vMotion, snapshot operations, snapshot schedules, cloning, disaster recovery, backup, long term storage, (4) performance optimizing operations, such as QoS policies (e.g., max and/or min I/O regulating policies), and (5) analytic operations, such as collecting performance metrics and usage data for virtual disk (10, latency, etc.) One example of a DSAN service is the vSAN service offered by VMware vSphere software. The DSAN service layer 1313 also includes a multipathing PSA layer in some embodiments.

The DSAN service module 1313 receives and sends storage related NVMe commands from and to the kernel NVMe module 1315. The kernel NVMe module 1315 interacts with either the NVMe RDMA driver 1316 or NVMe TCP driver 1317 to receive and send these NVMe commands. These drivers exchange these NVMe commands with the smart NIC OS 1320 through one or more virtual functions (VFs) 1322 defined for these drivers on the smart NIC OS.

In some embodiments, the smart NIC OS can present the smart NIC as multiple physical functions (PF) connected to the host computer. The PCIe bus 150, in some embodiments, allows for the creation of these PFs. A PF, in some embodiments, can be further virtualized as multiple virtual functions (VFs). More specifically, in some embodiments, physical functions and virtual functions refer to ports exposed by a smart NIC using a PCIe interface to connect to the host computer over the PCIe bus. A PF refers to an interface of the smart NIC that is recognized as a unique resource with a separately configurable PCIe interface (e.g., separate from other PFs on a same smart NIC). In some embodiments, each PF is executed by the processing units (e.g., microprocessors) of the host computer.

The VF refers to a virtualized interface that is not fully configurable as a separate PCIe resource, but instead inherits some configuration from the PF with which it is associated while presenting a simplified configuration space. VFs are provided, in some embodiments, to provide a passthrough mechanism that allows compute nodes executing on a host computer to receive data messages from the smart NIC without traversing a virtual switch of the host computer. The VFs, in some embodiments, are provided by virtualization software executing on the smart NIC. In some embodiments, each VF is executed by the processing units (e.g., microprocessors) of the smart NIC.

The VFs and PFs, in some embodiments, are deployed to support storage and compute virtualization modules. For example, a PF or VF can be deployed to present a storage or compute resource provided by the smart NIC as a local device (i.e., a device connected to the host computer by a PCIe bus). Defining such VFs are further described below.

The PF 1370 on the host has the corresponding VF 1322 on the smart NIC. The PF 1370 represents a shared NIC port to the NVMeOF drivers 1316 and 1317, which run on the host and convert the NVMe storage access commands to network packets. These drivers use this representative port 1370 to forward storage access packets to an external storage through the VF 1322 of the smart NIC 1320, and to receive storage access response packets from the external storage 1340 through the VF 1322 of the smart NIC 1320.

When the VF 1322 does not know how to process a packet (e.g., when it receives a first packet of a new flow for which it does not have a forwarding rule), the VF passes the packet through a "slow-path" that includes the virtual switch 1326 of the virtualization layer 1327, which then determines how to forward the packet and provides the VF with forwarding rule for forwarding the packet. On the other hand, when the VF 1322 knows how to process a packet (e.g., when the VF receives another packet of a flow that it has previously processed and/or for which it has a forwarding rule), the VF passes the packet through a "fast-path," e.g., passes a packet of a previously processed flow directly to the NIC driver 1325 for forwarding to an external storage 1340. Accordingly, in the example illustrated in FIG. 13, the VF 1322 is a network accelerator that facilitates the forwarding of the packets related to the external storages.

In some embodiments, the VF 1322 uses the smart NIC HOU 505 to perform its fast path forwarding. When the HOU is not programmed with flow-processing rules needed to process a new flow, the VF 1322 in some embodiments passes the packet to the virtualization layer 1327, which either identifies the flow-processing rule for a rule cache or passes the packet to a manager (executing on the smart NIC or on an external computer) that then determines the flow processing rule, and passes this rule back to the virtualization layer to use to forward the packet and to program the HOU. Once programmed, the VF can use the HOU to process subsequent packets of this flow.

Figure 14:
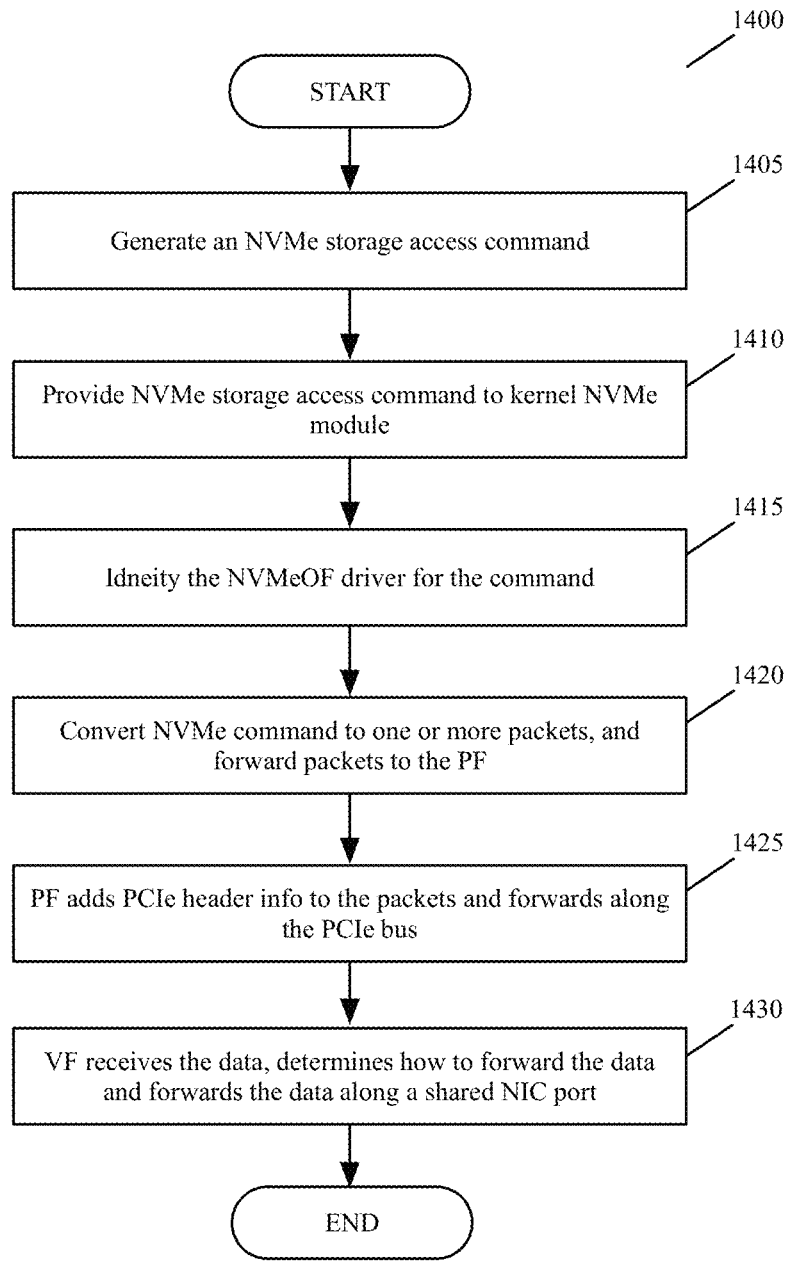
FIG. 14 illustrates a process performed to process an egress NVMe command by the smart NIC of FIG. 13.

FIG. 14 illustrates a process 1400 performed to process an egress NVMe command by the smart NIC 1320 of FIG. 13. In this example, the VM 1312 is presented an NVMe device through a virtual NVMe device emulation provided by the hypervisor 1314 (e.g., provided by a virtual NVMe device emulation module of the vSphere software of VMware Inc.). The NVMe device present in VM 1312 generates (at 1405) an NVMe command (with data). The VM's NVMe driver passes (at 1410) this NVMe command through the virtual device layer 1311 and the DSAN service layer 1313, to the kernel NVMe module 1315. At 1415, the kernel NVMe module 1315 identifies the NVMeOF controller that needs to process this NVMe command, and provides the packet to this controller 1316 or 1317.

The NVMEoRDMA 1316 or NVMEoTCP 1317 module running on the host (at 1420) converts the NVMe command to one or more NVMe network packets (NVMeOF packets) and passes the packets to a PF 1370 of the PCIe bus 150. At 1425, the PF 1370 adds PCIe header information to the NVMe network packets, and then passes the packets along the PCIe bus 150. The PCIe bus 150 creates a mapping between the PF 1370 and the VF module 1322 running on the smart NIC. Hence, the VF module 1322 receives each NVMeOF packet through the PCIe bus 150.

At 1430, the VFI module 1322 then transfers the NVMeOF packet either directly through the fast path to the NIC driver 1325, or indirectly to the NIC driver 1325 through the slow path that involves the virtual switch 1326.

The NIC driver 1325 then forwards the NVMeOF packet through a shared port of the smart NIC, so that this packet can be forwarded through intervening network fabric (e.g., intervening switches/routers) to reach its destination external storage 1340. In some embodiments, the fast-path processing of the VF 1322 allows the VF to directly pass the packet to the shared port of the smart NIC. The process then ends.

FIG. 15 illustrates another way of using the smart NIC as a network accelerator in some embodiments. In this example, one VM 1512 executes the NVMeOF driver, so that it cannot only bypass the DSAN service layer 1313, but also the kernel NVMe 1315 and NVMeOF drivers 1316-17 of the host hypervisor 1514 that executes over a host OS 1500. This approach provides the fastest access for a VM to one or more external storages through the VM's NVMeOF driver, which in this example is a GOS NVMe fabric driver. However, in this approach, no local storage is emulated for the VM 1514 by either the host or the smart NIC. This VM simply accesses the external storages through its NVMeOF driver. Specifically, in the example of FIG. 15, the GOS NVMeOF driver inside the VM 1512 presents the NVMe device to the VM 1512. Also, a PF 1580 is directly assigned to VM 1512 using a passthrough mode, such as SRIOV Mode or SIOV Mode.

For the PF 1580, the smart NIC OS in FIG. 15 defines a VF 1523 to process the packets associated with the VM 1514. In both FIGS. 13 and 15, the smart NIC OS has a virtual switch 1326 to perform software switching operations and a network virtualization 1327 layer to perform network virtualization operations for the smart NIC. In some embodiments, these operations are analogous to the operations that traditionally have been performed on host computers to provide software switching and network virtualization operations. The smart NIC OS 1320 also has a NIC driver 1325 to communicate with the external storages 1340 through one or more ports of the smart NIC.

Figure 16:
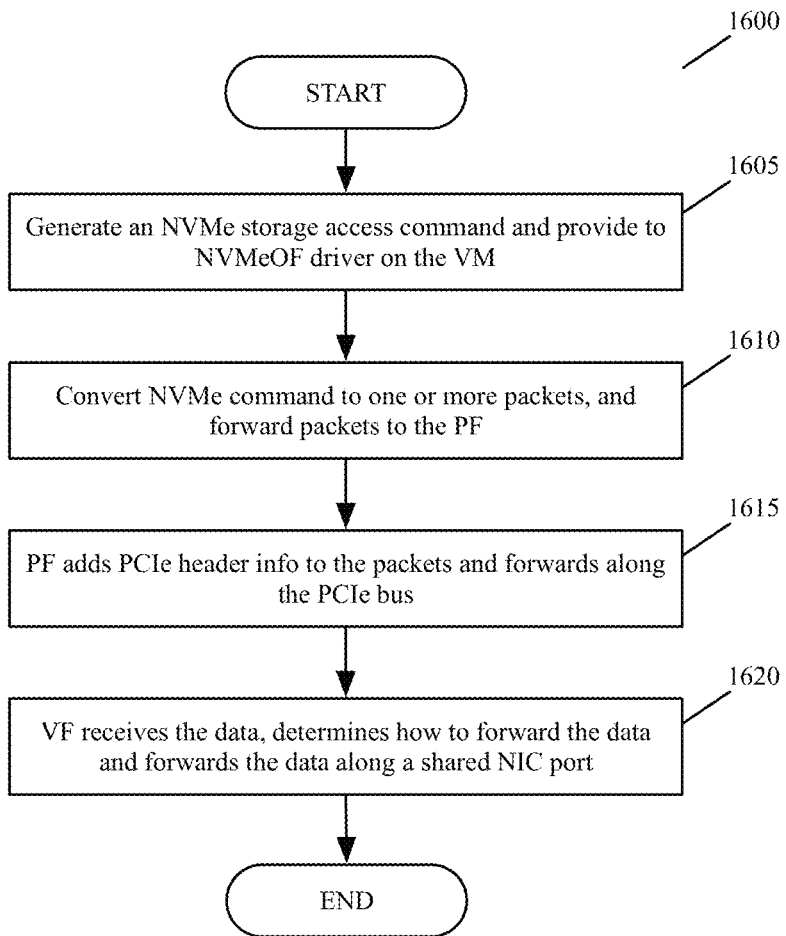
FIG. 16 illustrates a process that is performed to process egress packets from the VM.

FIG. 16 illustrates a process 1600 that is performed to process egress packets from the VM 1512. As shown, the process starts (at 1605) when an application running on the VM 1512 generates an NVMe command (with data), and provides this command to the NVMeOF driver executing on this VM. This driver then coverts (at 1610) the NVMe command to a set of one or more network packets, which it then provides to the PF 1580 directly.

The PF 1580 provides (at 1615) the set of network packets that contains the NVMe command (with data) to the VF2 1523, which is a high speed network adapter provided by the smart NIC 1320. As described above for VF 1322 and operation 1430 of FIG. 14, the VF2 1523 (at 1620) transfers the set of network packets (containing the NVMe command/data) through the direct fast path or the indirect slow path, to a shared NIC port for forwarding to an external storage 1340. In some embodiments, the shared NIC port can be used by both VFs 1322 and 1523 as well as other modules of the smart NIC for other forwarding operations.

The smart NIC operating system in some embodiments is provided with the host-computer hypervisor program as part of a single downloaded package. For instance, some embodiments provide a method for provisioning a smart NIC with a smart NIC operating system for enabling resource sharing on the smart NIC connected to a host computer. The method, in some embodiments, is performed by the host computer and begins when the host computer receives (1) a host-computer hypervisor program for enabling resource sharing on the host computer and (2) the smart NIC operating system. In some embodiments, the host-computer hypervisor program includes the smart NIC hypervisor program. The host computer then installs the host-computer hypervisor program and provides the smart NIC operating system to the smart NIC for the smart NIC to install on the smart NIC. One of ordinary skill in the art will appreciate that a hypervisor program is used as an example of virtualization software (e.g., software enabling resource sharing for a device executing the software).

The smart NIC, in some embodiments, is a NIC that includes (i) an application-specific integrated circuit (ASIC), (ii) a general purpose central processing unit (CPU), and (iii) memory. The ASIC, in some embodiments, is an I/O ASIC that handles the processing of packets forwarded to and from the computer and is at least partly controlled by the CPU. The CPU executes a NIC operating system in some embodiments that controls the ASIC and can run other programs, such as API translation logic to enable the compute manager to communicate with a bare metal computer. The smart NIC also includes a configurable peripheral control interconnect express (PCIe) interface in order to connect to the other physical components of the bare metal computer system (e.g., the x86 CPU, memory, etc.). Via this configurable PCIe interface, the smart NIC can present itself to the bare metal computer system as a multitude of devices, including a packet processing NIC, a hard disk (using non-volatile memory express (NVMe) over PCIe), or other devices.

Although not necessary for managing a bare metal computer, the NIC operating system of some embodiments is capable of executing a virtualization program (similar to a hypervisor) that enables sharing resources (e.g., memory, CPU resources) of the smart NIC among multiple machines (e.g., VMs) if those VMs execute on the computer. The virtualization program can provide compute virtualization services and/or network virtualization services similar to a managed hypervisor. These network virtualization services, in some embodiments, include segregating data messages into different private (e.g., overlay) networks that are defined over the physical network (shared between the private networks), forwarding the data messages for these private networks (e.g., performing switching and/or routing operations), and/or performing middlebox services for the private networks.

The host-computer hypervisor program and the smart NIC operating system, in some embodiments, are programs that do not have previous versions installed on the computer or the smart NIC. In other embodiments, the host-computer hypervisor program and the smart NIC operating system received by the host computer are update programs for previously installed versions of the host-computer hypervisor program and the smart NIC operating system. After a host-computer hypervisor program and the smart NIC operating system are received, the host computer, in some embodiments, receives an additional program for updating the smart NIC operating system and provides the received program to the smart NIC for the smart NIC to update the smart NIC operating system.

In some embodiments, after receiving the host-computer hypervisor program and the smart NIC operating system, the host computer detects (or determines) that the host computer is connected to the smart NIC. In some embodiments, the connection is made over a standard PCIe connection and the smart NIC is detected as a peripheral device that supports the installation of the smart NIC operating system. The host computer provides, based on the detection, the smart NIC operating system to the smart NIC for the smart NIC to install. In some embodiments, the smart NIC operating system is sent to the smart NIC along with an instruction to the smart NIC to install the smart NIC operating system.

In some embodiments, the host computer includes a local controller that receives the host-computer hypervisor program and the smart NIC operating system. The local controller, in some embodiments, provides the host-computer hypervisor program and the smart NIC operating system to a compute agent that installs the host-computer hypervisor program on the host computer to enable the host computer to share resources among a set of compute nodes (e.g., virtual machines, containers, Pods, etc.). The host-computer hypervisor program and the smart NIC operating system are particular examples of virtualization software that is used, in some embodiments, to enabling resource sharing for the host computer and smart NIC, respectively.

As mentioned above, the smart NIC in some embodiments includes a set of ASICs, a general purpose CPU, and a memory. The set of ASICs, in some embodiments, includes an ASIC for processing packets forwarded to and from the host computer as well as other ASICs for accelerating operations performed by the smart NIC on behalf of the host computer (e.g., encryption, decryption, storage, security, etc.). The smart NIC operating system, in some embodiments, includes virtualization programs for network virtualization, compute virtualization, and storage virtualization. The virtualization programs, in some embodiments, enable sharing the resources of the smart NIC among multiple tenants of a multi-tenant datacenter.

The network virtualization program provides network virtualization services on the smart NIC. The network virtualization services, in some embodiments, include forwarding operations (e.g., network switching operations and network routing operations). The forwarding operations are performed, in some embodiments, on behalf of multiple logically separate networks implemented over a shared network of a datacenter. Forwarding packets for different logical networks, in some embodiments, includes segregating packets for each logically separate network into the different logically separate networks. Forwarding operations for the different logical networks, in some embodiments, are implemented as different processing pipelines that perform different sets of operations. The different sets of operations include, in some embodiments, different logical packet forwarding operations (e.g., logical switching, logical routing, logical bridging, etc.) and different middlebox services (e.g., a firewall service, a load balancing service, etc.).

The compute virtualization program, in some embodiments, provides virtualized compute resources (virtual machines, containers, Pods, etc.) that execute over the compute virtualization program. The storage virtualization program, in some embodiments, provides storage virtualization services on the smart NIC. The virtualized storage, in some embodiments, include one or multiple of virtual storage area networks (vSANs), virtual volumes (vVOLs), and other virtualized storage solutions. The virtualized storage appears to the connected host computer as a local storage, in some embodiments, even when the physical resources that are the backend of the virtualized storage are provided by a distributed set of storages of multiple physical host computers.

Figure 17:
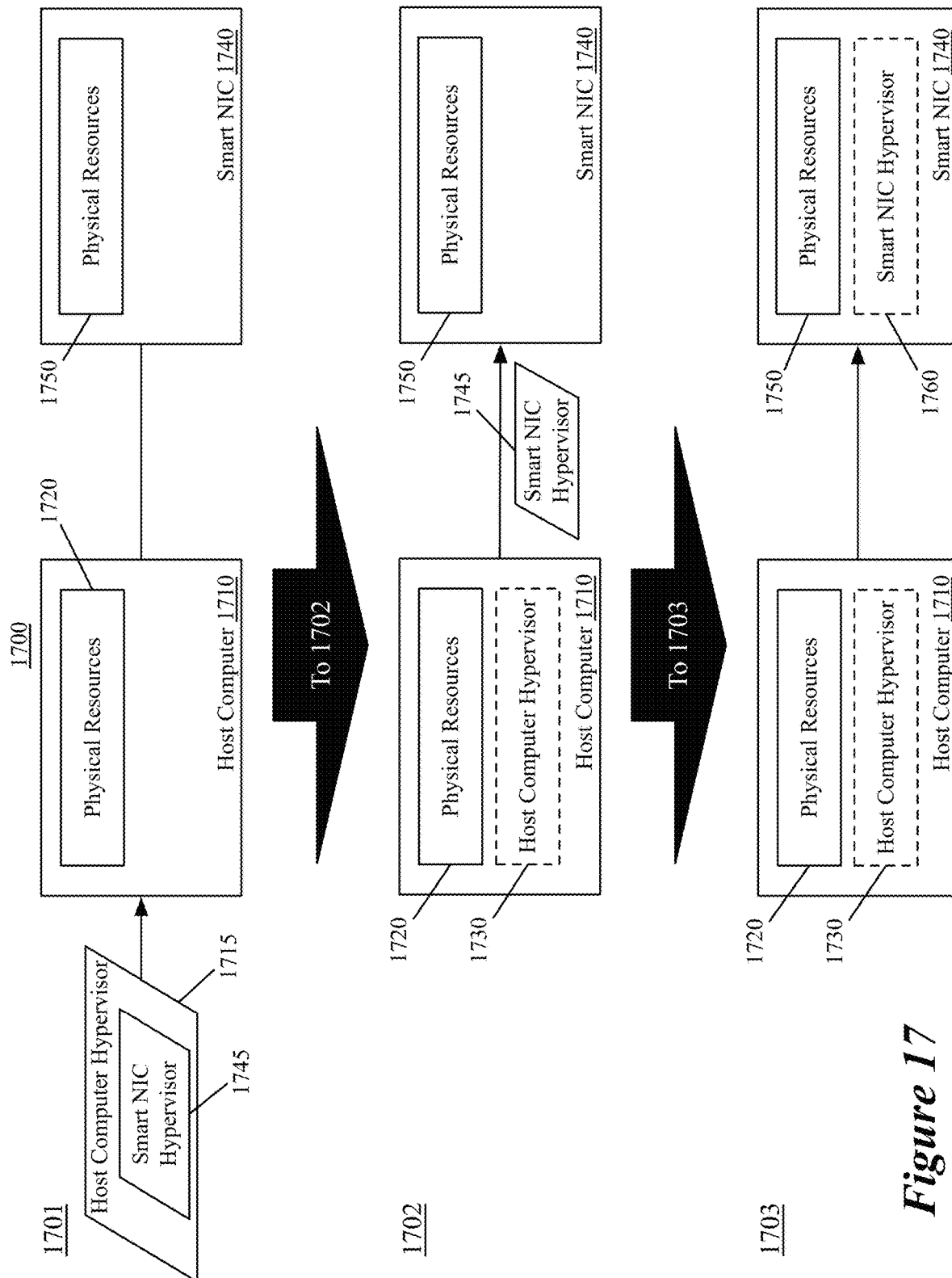
FIG. 17 illustrates a system including a host computer and a connected smart NIC being configured with a host computer virtualization program and a smart NIC operating system.

FIG. 17 illustrates a system 1700 including a host computer 1710 and a connected smart NIC 1740 being configured with host computer virtualization software 1730 and a smart NIC operating system 1760. Host computer 1710 includes a set of physical resources 1720 and smart NIC 1740 includes a separate set of physical resources 1750. The set of physical resources 1720 of the host computer 1710, in some embodiments, includes any or all of a set of general purpose central processing units (CPUs), memory, and storage. The set of physical resources 1750 of the smart NIC 1740, in some embodiments, include any or all of a set of general purpose central processing units (CPUs), application-specific integrated circuits (ASICs), field-programmable gate arrays (FPGAs), memory, and storage. The configuration of the host computer 1710 and smart NIC 1740 depicted in FIG. 17 will be described in relation to FIG. 18.

Figure 18:
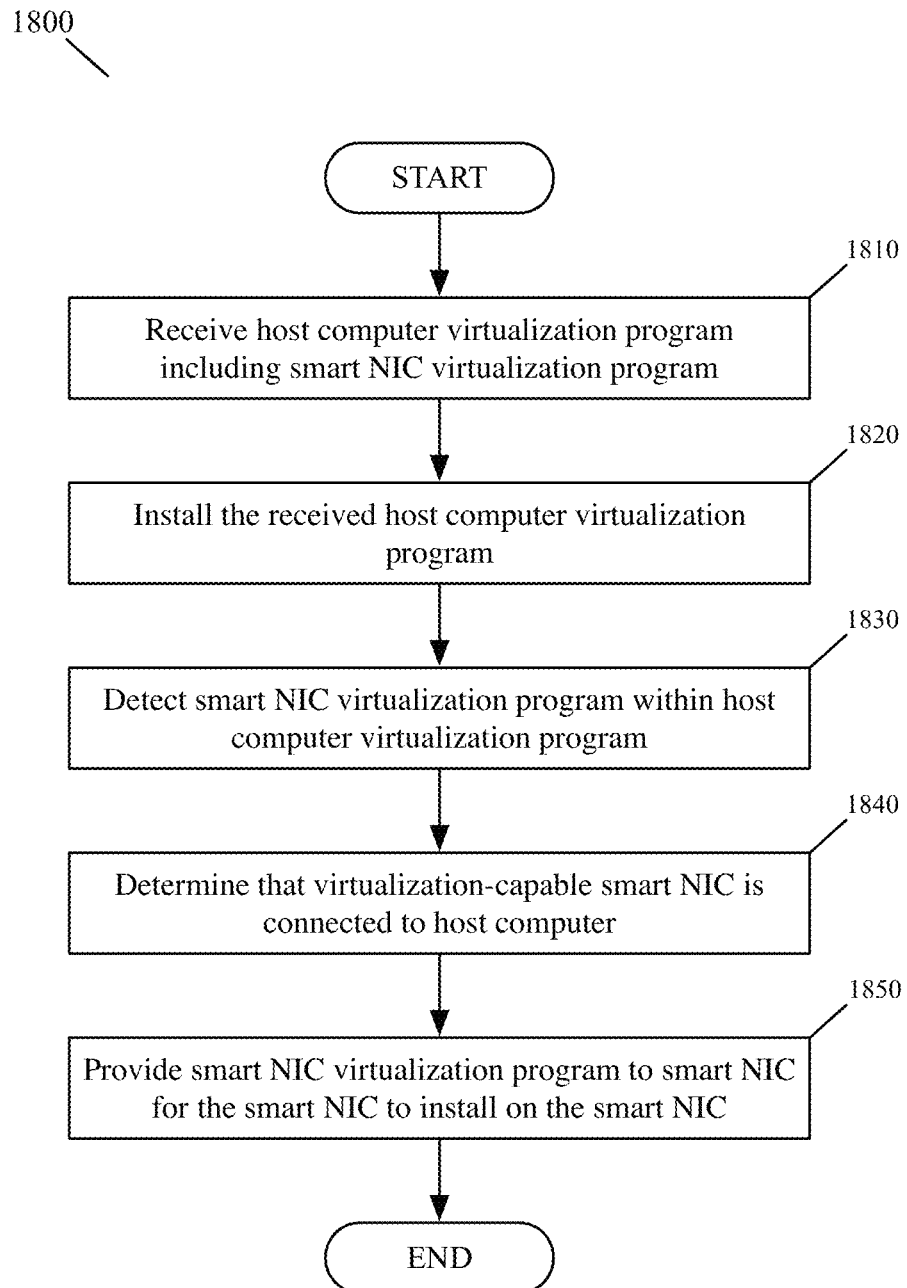
FIG. 18 conceptually illustrates a process for installing programs enabling resource sharing on a host computer and smart NIC.

FIG. 18 conceptually illustrates a process 1800 for installing programs enabling resource sharing on a host computer and smart NIC. The program for enabling resource sharing on the host computer, in some embodiments, is one of a hypervisor program, a virtual machine monitor, or other virtualization software. In some embodiments, the program for enabling resource sharing on the host computer executes as an operating system (OS) executing directly on the hardware of the host computer, while in other embodiments, the program executes as a software layer on top of an OS. Similarly, the program for enabling resource sharing on the smart NIC, in some embodiments, executes as an operating system (OS) executing directly on the hardware of the smart NIC, while in other embodiments, the program executes as a software layer on top of an OS.

The process 1800, in some embodiments, is performed by a host computer (e.g., host computer 1710) that in some embodiments, is a host computer (e.g., an x86 server) provided by a datacenter provider. The process 1800 begins by receiving (at 1810) a host-computer virtualization program (e.g., host-computer hypervisor program 1715) that includes a smart NIC operating system (e.g., smart NIC hypervisor program 1745). The host-computer virtualization program (e.g., host-computer hypervisor program 1715) and smart NIC operating system (e.g., smart NIC hypervisor program 1745), in some embodiments, are installer programs that install virtualization software (e.g., a software virtualization layer or a virtualization OS). The host-computer virtualization program, in some embodiments, is received from a network controller computer to configure the host computer to support virtualized compute nodes, storage, network cards, etc., to be implemented on the host computer for a virtual or logical network associated with the network controller computer.

Stage 1701 of FIG. 17 illustrates a host computer 1710 that has not yet been configured by virtualization software receiving a host-computer hypervisor program 1715 that includes smart NIC hypervisor program 1745. In some embodiments, the two programs 1715 and 1745 are received separately (e.g., simultaneously as part of a package or sequentially). In other embodiments, the program received (at 1810) is an update to one or both of the host-computer virtualization program and the smart NIC operating system. The update, in some embodiments, is processed as an update to the host-computer virtualization program even in the case that the update includes only updates to the smart NIC operating system.

After receiving (at 1810) the host-computer virtualization program and the smart NIC operating system, the host computer then installs (at 1820) the received host-computer virtualization program (e.g., host-computer hypervisor program 1715) on the host computer. The virtualization program, in some embodiments, is a hypervisor such as ESXi™ provided by VMware, Inc. or other virtualization programs. As shown in stage 1702 of FIG. 17, the host computer 1710 installs a host computer hypervisor 1730 (dashed lines in FIG. 17 indicating software executing on a device) after receiving the host-computer hypervisor program 1715. After installing the host-computer virtualization program 1715, the host computer 1710 is able to provide virtual resources (e.g., compute nodes, virtual switches, virtual storage, etc.) based on the physical resources 1720 of the host computer 1710.

After, or as part of, installing (at 1820) the host-computer virtualization program, the host computer detects (at 1830) that the smart NIC operating system is included in the host-computer virtualization program. In some embodiments, detecting (at 1830) that the smart NIC operating system is incorporated in the host-computer virtualization program includes a set of operations to perform to program any virtualization-capable smart NICs connected to the host computer. The set of operations, in some embodiments, includes an operation to detect whether a virtualization-capable smart NIC is connected to the host computer.

The host computer determines (at 1840) that a virtualization-capable smart NIC is connected to the host computer. In some embodiments, determining (at 1840) that a virtualization-capable smart NIC is connected to the host computer is part of the installation process for the host-computer virtualization program. Determining (at 1840) that a virtualization-capable smart NIC is connected to the host computer, in some embodiments, is based on a set of components exposed to the host computer by the smart NIC. In some embodiments, the host-computer virtualization program (e.g., an ESXi™ installer) queries a baseboard management controller (BMC) of the host computer to determine (at 1840) that the smart NIC is compatible with the smart NIC operating system (e.g., a smart NIC operating system (OS) such as ESXio™). In some embodiments, a virtualization-capable smart NIC is identified to the connected host computer during a previously performed process that configures the connection between the host-computer virtualization program computer and the smart NIC.

After determining (at 1840) that a virtualization-capable smart NIC is connected to the host computer, the host computer provides (at 1850) the smart NIC operating system to the smart NIC for the smart NIC to install a virtualization layer to enable the smart NIC to share resources on the smart NIC. FIG. 17 illustrates, in stage 1702, that the host computer 1710 sends the smart NIC hypervisor program 1745 to smart NIC 1740 for the smart NIC 1740 to install a smart NIC operating system. In stage 1703 of FIG. 17, the smart NIC 1740 installs smart NIC hypervisor 1760 to enable virtualization of the physical resources 1750 of the smart NIC 1740.

Figure 19:
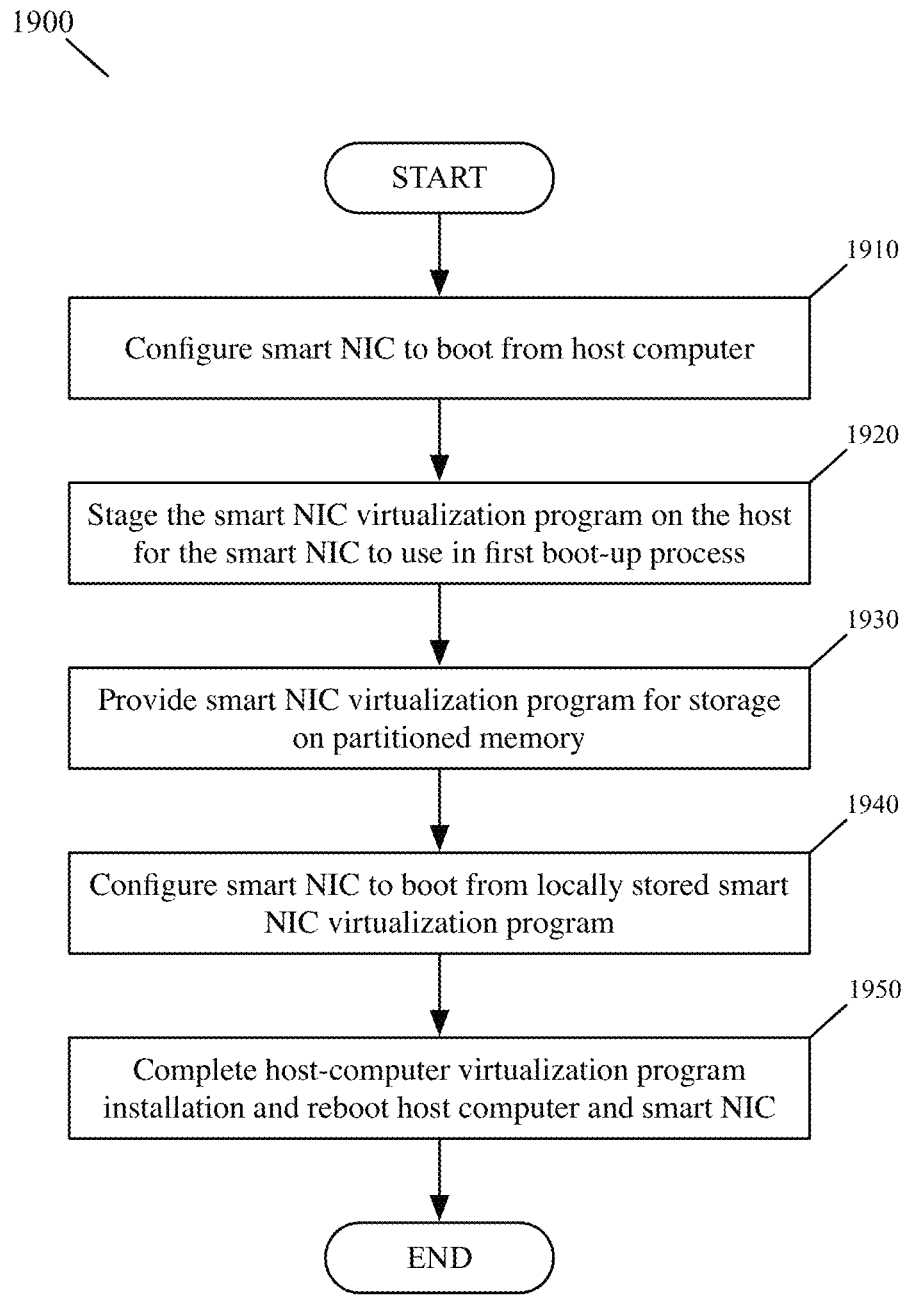
FIG. 19 conceptually illustrates a process that, in some embodiments, represents sub-operations of an operation described in relation to FIG. 18.

In some embodiments, providing (at 1850) the smart NIC operating system for the smart NIC to install the smart NIC operating system includes multiple sub-operations. FIG. 19 conceptually illustrates a process 1900 that, in some embodiments, represents the sub-operations that are included in operation 1850. FIG. 19 is described, at least in part, in relation to FIGS. 20-22. Process 1900 begins by configuring (at 1910) the smart NIC to boot from an image stored on the host computer. In some embodiments, the host-computer virtualization program invokes BMC APIs to configure (at 1910) the smart NIC to enable a unified extensible firmware interface (UEFI) SecureBoot on the smart NIC.

After configuring the smart NIC to enable booting from an image stored on the host computer, the smart NIC operating system is staged (at 1920) on the host computer for the smart NIC to use in an initial boot-up process. The host-computer virtualization program, in some embodiments, invokes BMC APIs to stage (at 1920) the smart NIC operating system (e.g., ESX.io) in BMC storage as an image file (e.g., as an ISO, DD, tgz, or zip file) for the smart NIC to perform the initial boot-up of the smart NIC operating system.

Figure 20:
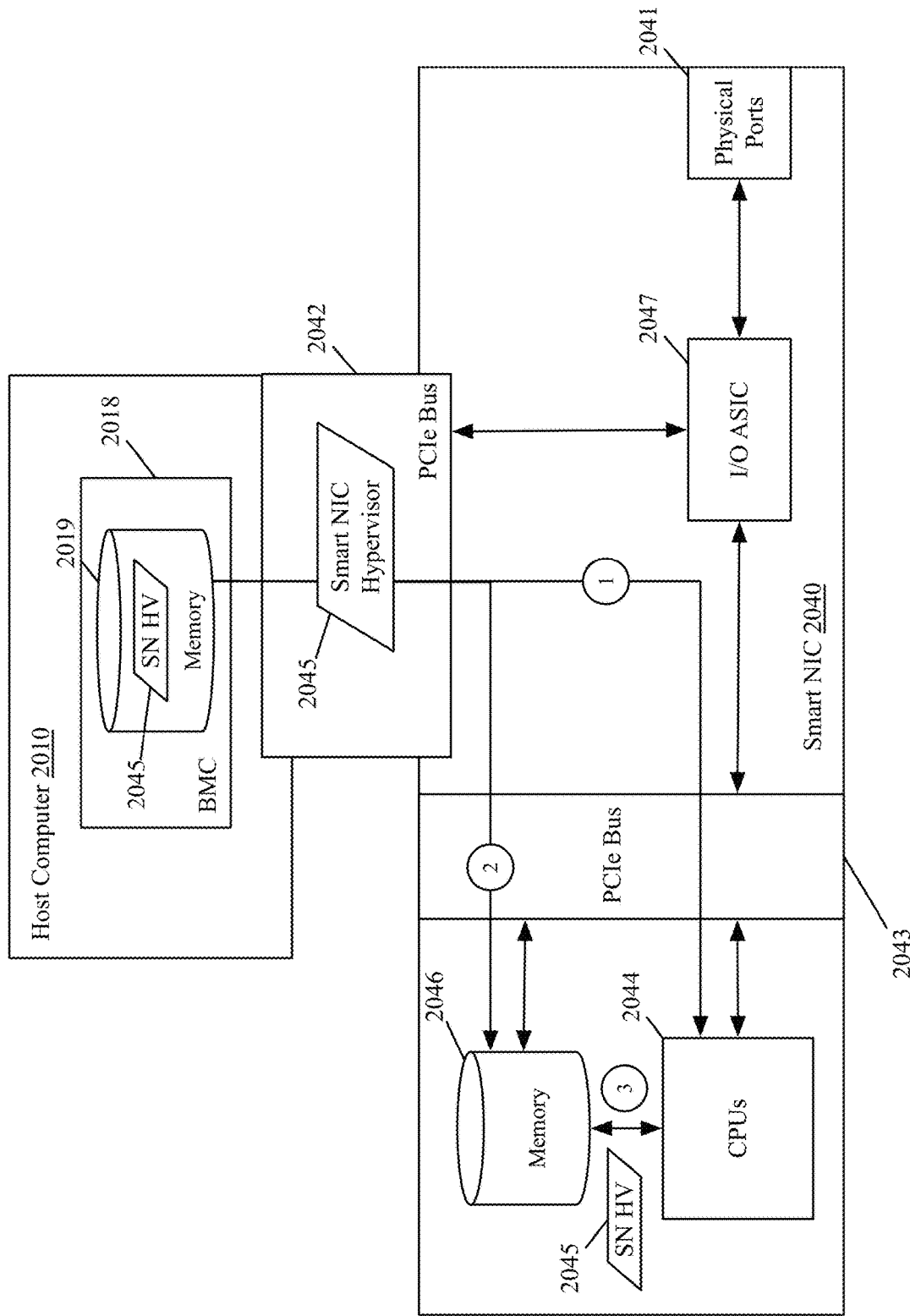
FIG. 20 illustrates a simplified view of a host computer including a baseboard management controller (BMC) and connecting to the smart NIC through a PCIe bus.

FIG. 20 illustrates a simplified view of host computer 2010, including BMC 2018 connecting to smart NIC 2040 through PCIe bus 2042. FIG. 20 illustrates that the BMC 2018 provides a smart NIC operating system 2045 stored in BMC memory 2019 to the CPU 2044 of the smart NIC 2040 for the CPU 2044 to perform a first boot from the image stored in BMC storage 2019 (operation "1"). FIG. 20 illustrates components of the smartNIC, which will be described below by reference to other figures.

Figure 21:
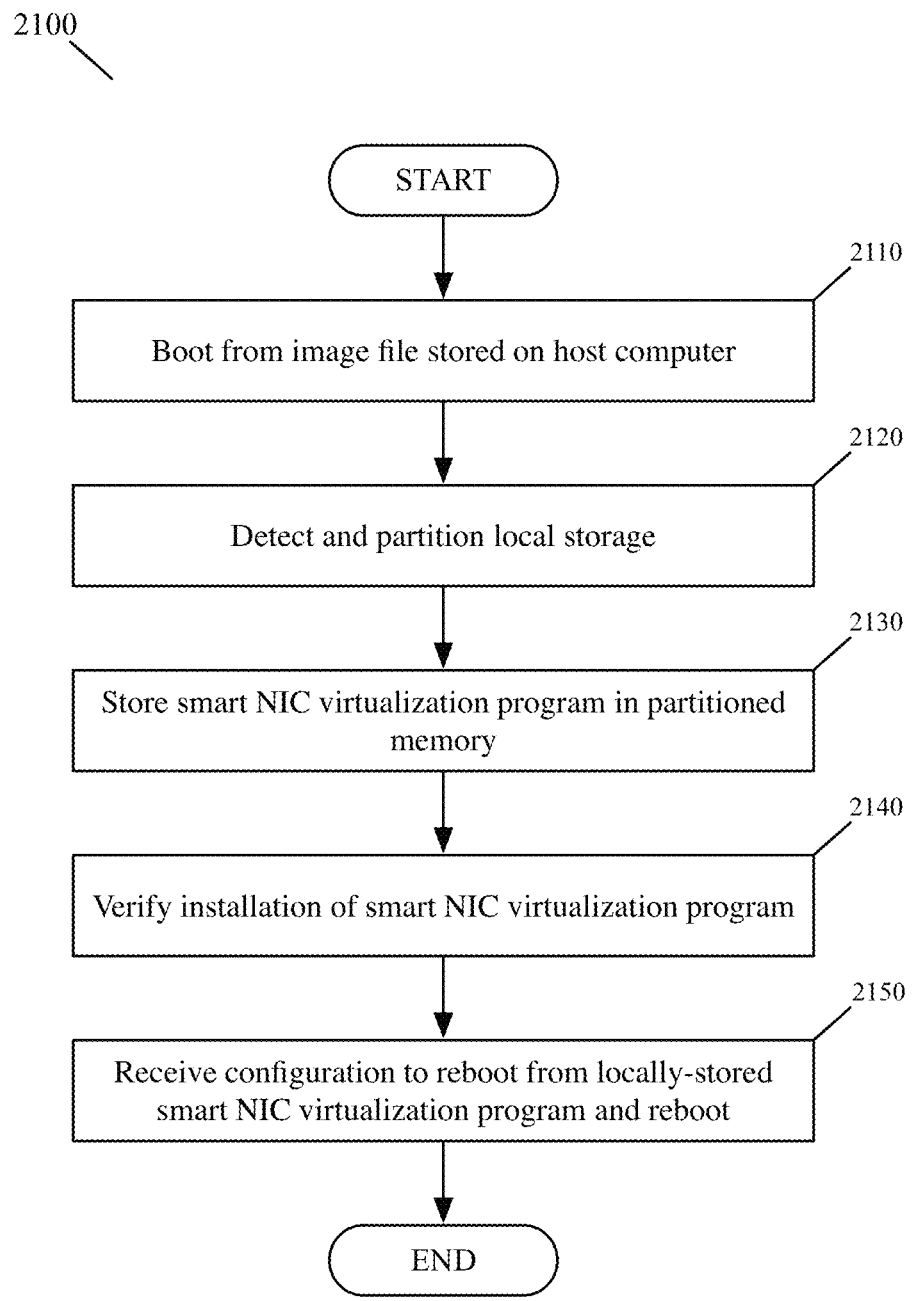
FIG. 21 conceptually illustrates a process that is performed by the smart NIC to install the smart NIC operating system as part of the process described in FIG. 19.

At 1930, the process 1900 provides the smart NIC virtualization program for storage on partitioned memory. FIG. 21 conceptually illustrates a process 2100 that is performed by the smart NIC to install the smart NIC operating system as part of process 1900 of FIG. 19. In some embodiments, the smart NIC, at this point, performs (at 2110) a boot sequence for the smart NIC operating system from the BMC storage of the host computer. During the initialization, the local storage (e.g., embedded multi-media controller (eMMC), or other memory) is detected and partitioned (at 2120). In some embodiments, the local storage is detected based on initialization scripts of the smart NIC operating system. The detected storage is then partitioned.

Figure 22:
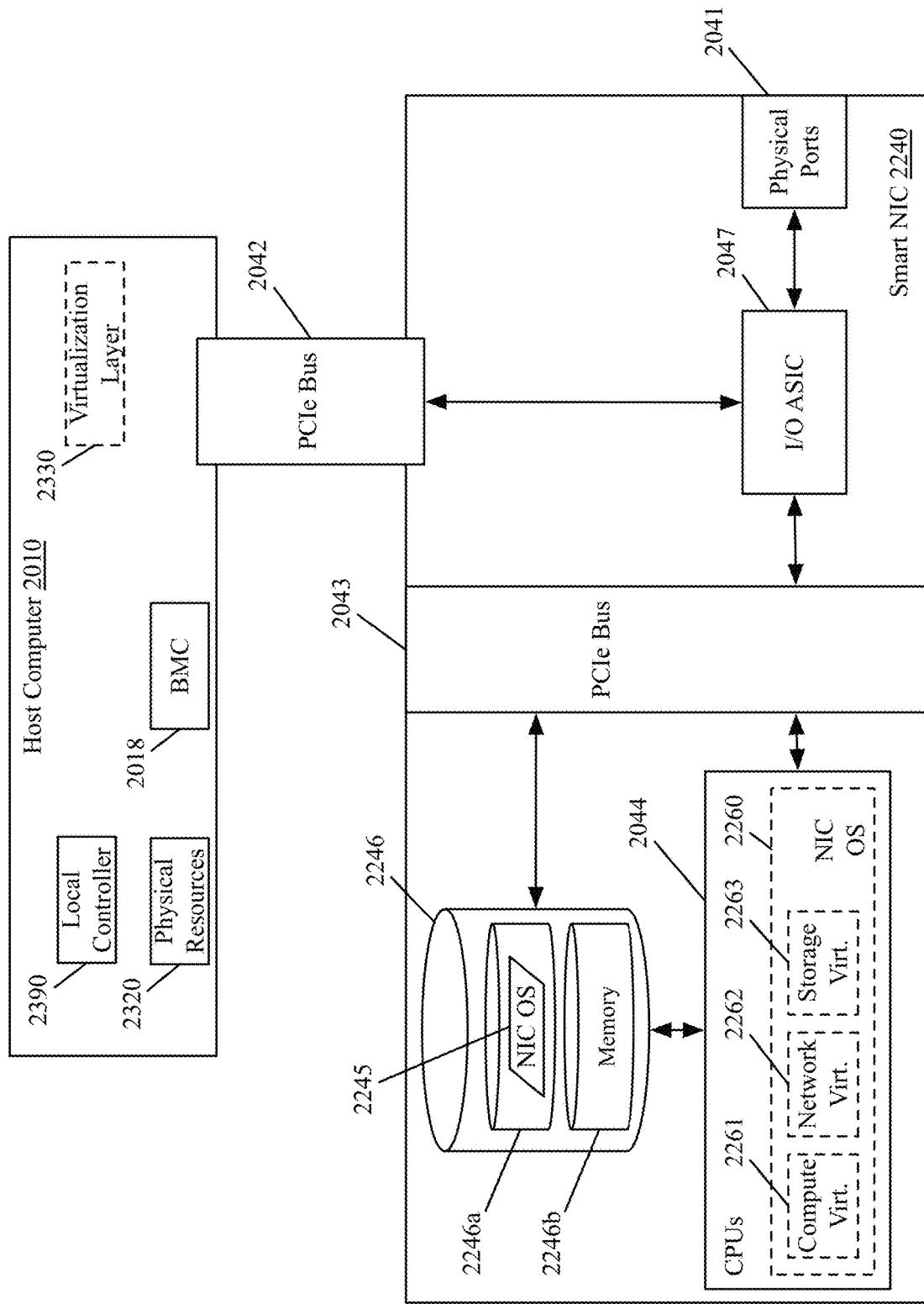
FIG. 22 illustrates a smart NIC after the installation is complete with its storage partitioned into a first partition storing the smart NIC operating system and a second partition.

The smart NIC operating system (e.g., ESX.io bootloader and system modules) is then stored (at 2130) in the local partitioned storage. In some embodiments, the smart NIC operating system is copied to the smart NIC local storage for storing (at 2130) from the host computer based on a process of the smart NIC operating system. In other embodiments, the host-computer virtualization program detects that the smart NIC has booted from the image and partitioned the storage and provides the smart NIC operating system to the smart NIC for storage (at 2130). FIG. 22 illustrates a smart NIC 2240 after the installation is complete with its storage 2246 partitioned into a first partition 2246a storing the smart NIC operating system (NIC OS) 2245 and a second partition 2246b.

FIG. 20 illustrates that after providing the smart NIC operating system 2045 to the CPU 2044 (in operation "1"), the smart NIC operating system is provided to the memory 2046 (as operation "2"). In this example, the smart NIC OS 2045 is provided through the external PCIe bus 2042 and an internal PCIe bus 2043. The internal PCIe bus 2043 connects the I/O ASIC side of the NIC (including ASIC 2047 and physical ports 2041) with the CPU side of the NIC (including CPU 2044 and memory 2046). While FIG. 20 and several other figures described below use an internal PCIe bus 2043, other embodiments do not use an internal PCIe bus. For instance, some embodiments implement the NIC as a system-on-chip and have the different circuits of the NIC communicate through other interconnects and buses.

The smart NIC operating system then verifies (at 2140) that the installation was successful. In some embodiments, verifying (at 2140) that the installation was successful includes verifying that the smart NIC device and functions are successfully enumerated. The verification (at 2140), in some embodiments, is based on a set of post-installation scripts. In some embodiments, the verification includes a communication to the host-computer virtualization program installation process that the installation on the smart NIC was successful.

The host computer BMC then configures (at 1940) the smart NIC to boot from the local copy of the smart NIC operating system. FIG. 20 illustrates that after the smart NIC operating system is stored in the memory 2046, the CPU accesses the smart NIC operating system (SN HV 2045) from the memory 2046 (as operation "3").

The host computer then completes (at 1950) the installation of the host-computer virtualization program and reboots the host computer and the smart NIC. These operations (1940 and 1950) are reflected in process 2100 of FIG. 21 in operation 2150, in which the smart NIC is configured to boot from the locally-stored smart NIC operating system and is rebooted. In some embodiments, the host computer is rebooted first to complete the installation of the host-computer virtualization program, and the host computer and smart NIC are then rebooted again to complete the installation of the smart NIC operating system. The host computer, in some embodiments, is rebooted first and then initiates a reboot of the smart NIC (from the smart NIC operating system stored in the memory of the smart NIC). In embodiments in which the smart NIC supports compute nodes of multiple tenants, an attempt to install the smart NIC operating system by another tenant's host-computer virtualization program installer is blocked. In some embodiments, the installation by a second tenant is unnecessary and would destroy any virtualization already performed for the first tenant. In such embodiments, the smart NIC or the host-computer virtualization program installer is programmed in such a way to determine if the smart NIC operating system is already installed. Additionally, the smart NIC or the host-computer hypervisor program installer, in some embodiments, is programmed to identify the tenant that installed the smart NIC operating system to allow updates to the smart NIC operating system made by that tenant.

As illustrated in FIG. 17, the host-computer hypervisor program 1715 and the smart NIC hypervisor 1745, in some embodiments, are programs that do not have previous versions installed on the host computer 1710 or the smart NIC 1740. In other embodiments, the host-computer hypervisor program 1715 and the smart NIC hypervisor 1745 received by the host computer 1710 are update programs for previously-installed versions of the host-computer hypervisor program 1715 and the smart NIC hypervisor 1745. In yet other embodiments, after a host-computer hypervisor program 1715 and the smart NIC hypervisor 1745 are received, the host computer 1710, in some embodiments, receives an additional program for updating the smart NIC hypervisor 1745 and provides the received program to the smart NIC 1740 for the smart NIC 1740 to update the smart NIC hypervisor 1745.

FIG. 22 illustrates a smart NIC 2240 after a set of configuration processes similar or identical to those described above in relation to FIGS. 18, 19, and 21. After installing the smart NIC operating system 2245, the CPUs 2044 execute a NIC operating system 2260 (e.g., a hypervisor, virtualization OS, or virtual machine monitor, etc.) that includes, in some embodiments, a compute virtualization module 2261, a network virtualization module 2262, and a storage virtualization module 2263. In some embodiments, a smart NIC operating system 2260 supports only a subset of these functions, supports additional functions, or supports a different combination of functions. The network virtualization module (or capability) 2262, in some embodiments, is used to present the smart NIC 2240 as multiple physical functions (PF) connected to a single host computer (e.g., a server) or a set of host computers. Each PF, in some embodiments, can be further virtualized as multiple virtual functions (VFs).

As used in this document, physical functions (PFs) and virtual functions (VFs) refer to ports exposed by a smart NIC using a PCIe interface to connect to a host computer (or set of host computers) over a PCIe bus. A PF refers to an interface of the smart NIC that is recognized as a unique resource with a separately configurable PCIe interface (e.g., separate from other PFs on a same smart NIC). The VF refers to a virtualized interface that is not fully-configurable as a separate PCIe resource, but instead inherits some configuration from the PF with which it is associated while presenting a simplified configuration space. VFs are provided, in some embodiments, to provide a passthrough mechanism that allows compute nodes executing on a host computer to receive data messages from the smart NIC without traversing a virtual switch of the host computer. The VFs, in some embodiments, are provided by virtualization software executing on the smart NIC. The VFs and PFs, in some embodiments, are deployed to support the storage and computer virtualization modules 2263 and 2261. For example, a PF or VF can be deployed to present a storage or compute resource provided by the smart NIC as a local device (i.e., a device connected to the host computer by a PCIe bus).

The smart NIC 2240 also includes a local memory 2246 and a set of general purpose CPUs 2044 that are used to install (and support) the virtualization layer 2330, which enables resource sharing of elements on the I/O portion and a compute portion of the smart NIC (e.g., the CPUs 2044, memory 2246, etc.). As shown, smart NIC operating system 2245 is stored in memory 2246 (and more specifically, in memory partition 2246a) which communicates with the CPUs 2044 to execute the smart NIC operating system 2245 to install the NIC operating system 2260 (e.g., ESX.io). In some embodiments, the memory 2246 is an embedded multi-media controller (eMMC) memory that includes flash memory and a flash memory controller. The memory 2246 and the CPUs 2044 communicate, in some embodiments, with other elements of the smart NIC 2240 over an internal PCIe bus 2043.

Smart NIC 2240 also includes an I/O ASIC 2047 (among a set of additional ASICs or field-programmable gate arrays (FPGAs) not shown) that can be used to accelerate data message forwarding or other networking functions (encryption, security operations, storage operations, etc.). A set of physical ports 2041 that provide connections to a physical network and interacts with the I/O ASIC 2047 is also included in smart NIC 2240. The I/O ASIC and physical ports that are depicted in FIG. 20 perform a similar operations.

The host computer and smart NIC, in some embodiments, are elements of a datacenter that implements virtual networks for multiple tenants. In some embodiments, the virtual networks implemented in the datacenter include one or more logical networks including one or more logical forwarding elements, such as logical switches, routers, gateways, etc. In some embodiments, a logical forwarding element (LFE) is defined by configuring several physical forwarding elements (PFEs), some or all of which execute on host computers or smart NICs along with deployed compute nodes (e.g., VMs, Pods, containers, etc.). The PFEs, in some embodiments, are configured to implement two or more LFEs to connect two or more different subsets of deployed compute nodes. The virtual network in some embodiments, is a software-defined network (SDN) such as that deployed by NSX-T™ and includes a set of SDN managers and SDN controllers. In some embodiments, the set of SDN managers manage the network elements and instruct the set of SDN controllers to configure the network elements to implement a desired forwarding behavior for the SDN.

Figure 23:
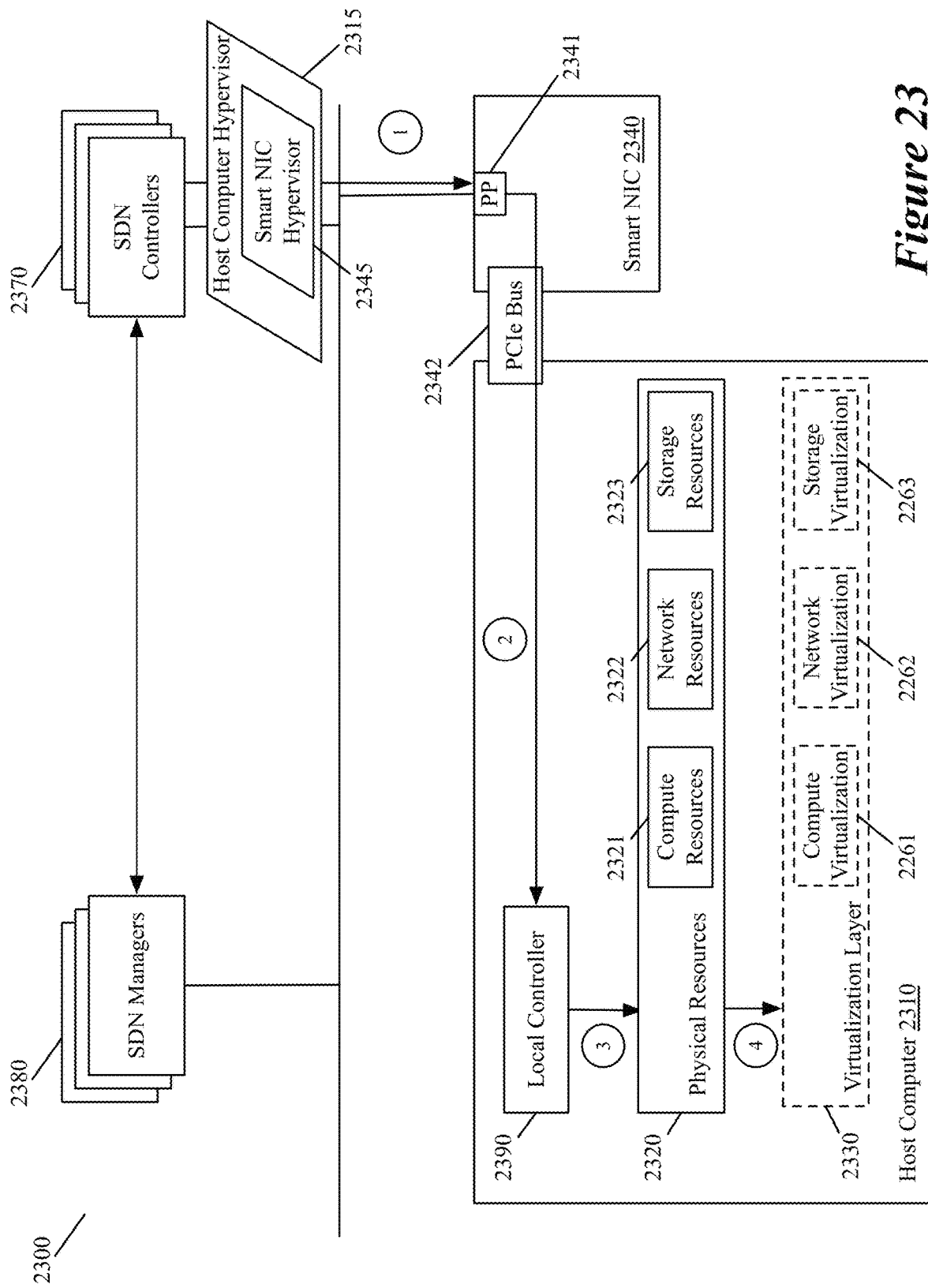
FIG. 23 illustrates a system that includes the host computer, the smart NIC, a set of SDN controller computers, and a set of SDN manager computers.

FIG. 23 illustrates a system 2300 that includes the host computer 2310, the smart NIC 2340, a set of SDN controller computers 2370, and a set of SDN manager computers 2380. The set of SDN manager computers 2380 implement a management plane for a particular SDN (e.g., a cloud provider SDN, or a tenant SND executed in the cloud or in a private datacenter). The set of SDN manager computers 2380 receive input from a user to implement a certain SDN configuration including, in some embodiments, configuration for a set of LFEs, a set of compute nodes, and a set of storage resources. The set of SDN manager computers 2380 communicate the desired configurations to the set of SDN controller computers 2370 implementing a control plane for the SDN. The set of SDN controllers 2370 generate configuration data for a set of host computers (including host computer 2310) and provide control messages to a local controller 2390 on the host computer 2310 to configure a set of the network elements specified by a user. In some embodiments, the SDN manager computers 2380 and SDN controller computers 2370 are the NSX-T™ managers and controllers licensed by VMware, Inc.

As shown, the set of SDN controller computers 2370 send a host-computer hypervisor program 2315 to a local controller 2390 of host computer 2310 through smart NIC 2340 (using physical port (PP) 2341 and a PCIe bus 2342). In some embodiments, the host-computer hypervisor program 2315 is an installer program executed by the compute resources 2321 of host computer 2310 to install a virtualization layer 2330 (e.g., a hypervisor such as ESXi™ provided by VMware, Inc.) to enable the physical resources 2320 of host computer 2310 (including compute, network and storage resources 2321, 2322, and 2323) to be shared among multiple virtualized machines.

Local controller 2390 receives the host-computer hypervisor program 2315 and provides it to the physical resources 2320 (e.g., runs the host-computer hypervisor program 2315 using the compute resources 2321 of the host computer 2310). Based on the host-computer hypervisor program 2315, a virtualization layer 2330 is installed on the host computer 2310 (shown using dashed lines to distinguish between hardware and software of the host computer 2310). While virtualization layer 2330 is shown as including a compute virtualization module 2261, a network virtualization module 2262, and a storage virtualization module 2263, in some embodiments, a virtualization layer 2330 supports only a subset of these functions, supports additional functions, or supports a different combination of functions. As described above in relation to FIG. 18, as part of executing host-computer hypervisor program 2315 to install the virtualization layer 2330, the host computer 2310 will provide smart NIC operating system 2345 to smart NIC 2340 for the smart NIC 2340 to execute (e.g., install a smart NIC virtualization layer).

Figure 24:
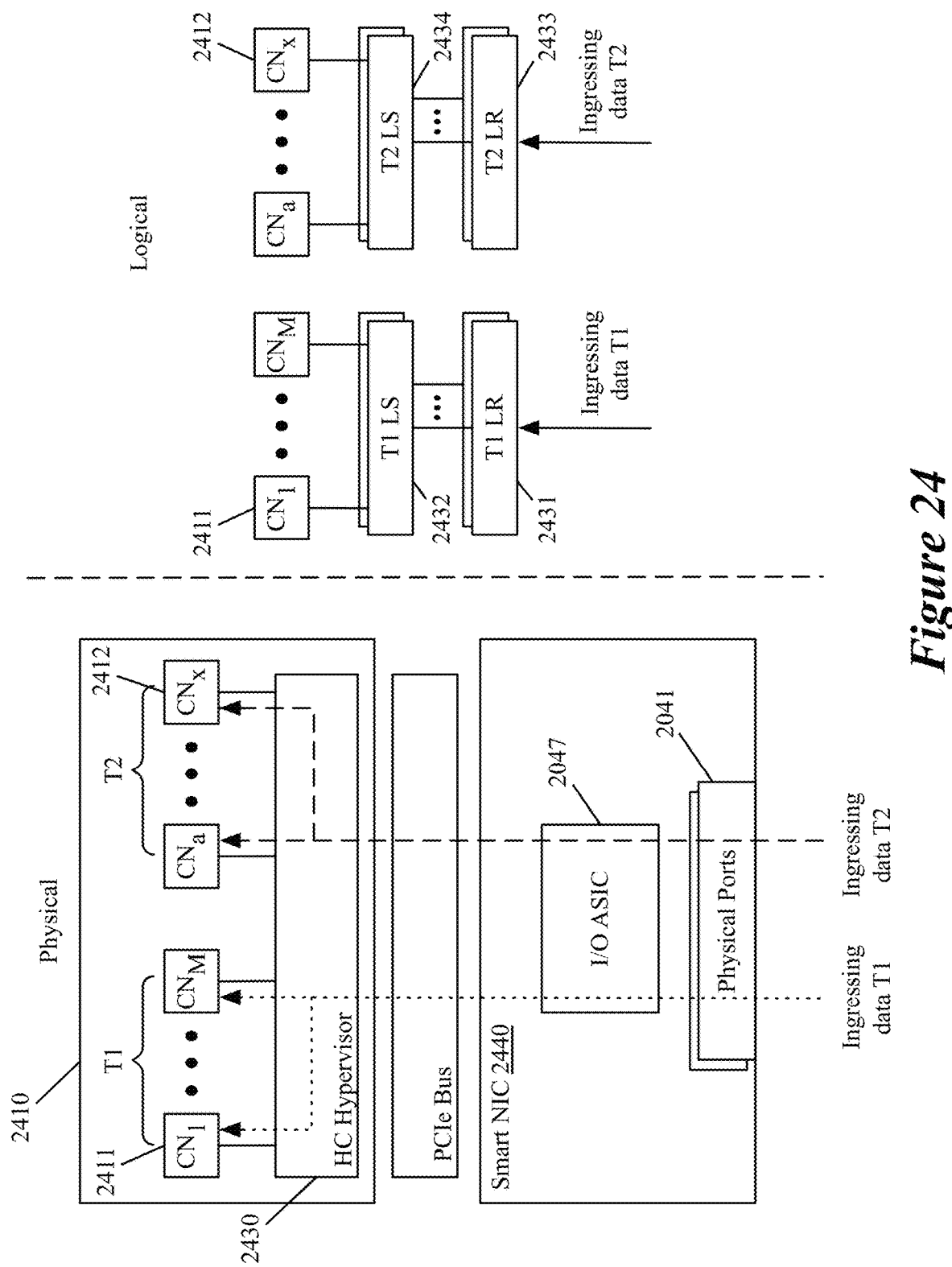
FIG. 24 illustrates a host computer executing a host computer hypervisor and a set of compute nodes ($CN_1$-$CN_M$) for a first tenant ("T1") and a set of compute nodes ($CN_a$-$CN_x$) for a second tenant ("T2").

FIG. 24 illustrates a host computer 2410 executing a host computer hypervisor 2430 and a set of compute nodes (CN$_1$-CN$_M$) 2411 for a first tenant ("T1") and a set of compute nodes (CN$_a$-CN$_x$) 2412 for a second tenant ("T2"). FIG. 24 also illustrates a logical view of the separate logical networks defined for T1 and T2. As shown, the logical networks for the separate tenants include a set of logical routers and logical switches (2431 and 2432 for T1 and 2433 and 2434 for T2, respectively) that connect the compute nodes of the tenant. The different logical networks are both implemented by the host computer hypervisor 2430 and, in some embodiments, the smart NIC 2440. The host computer hypervisor 2430, in some embodiments, includes a virtual switch (e.g., a software switch) that implements the LRs and LSs for the different tenants on the host computer 2410. In some embodiments, the I/O ASIC 2047 of the smart NIC 2440 is configured by the host computer hypervisor 2430 to perform logical routing and logical switching operations for the separate tenants. In other embodiments, the I/O ASIC 2047 of the smart NIC 2440 is configured by a hypervisor (not shown) of the smart NIC 2440.

The I/O ASIC 2047 of the smart NIC 2440 and the host computer hypervisor 2430, in some embodiments, implement separate processing pipelines for the separate tenants (e.g., the separate logical networks). Data messages, e.g., ingressing data messages T1 and T2, are segregated into the different processing pipelines of the different logical networks of the different tenants, in some embodiments, based on logical network identifiers (e.g., virtual local area network (VLAN) or virtual extensible LAN (VXLAN) identifiers).

Figure 25:
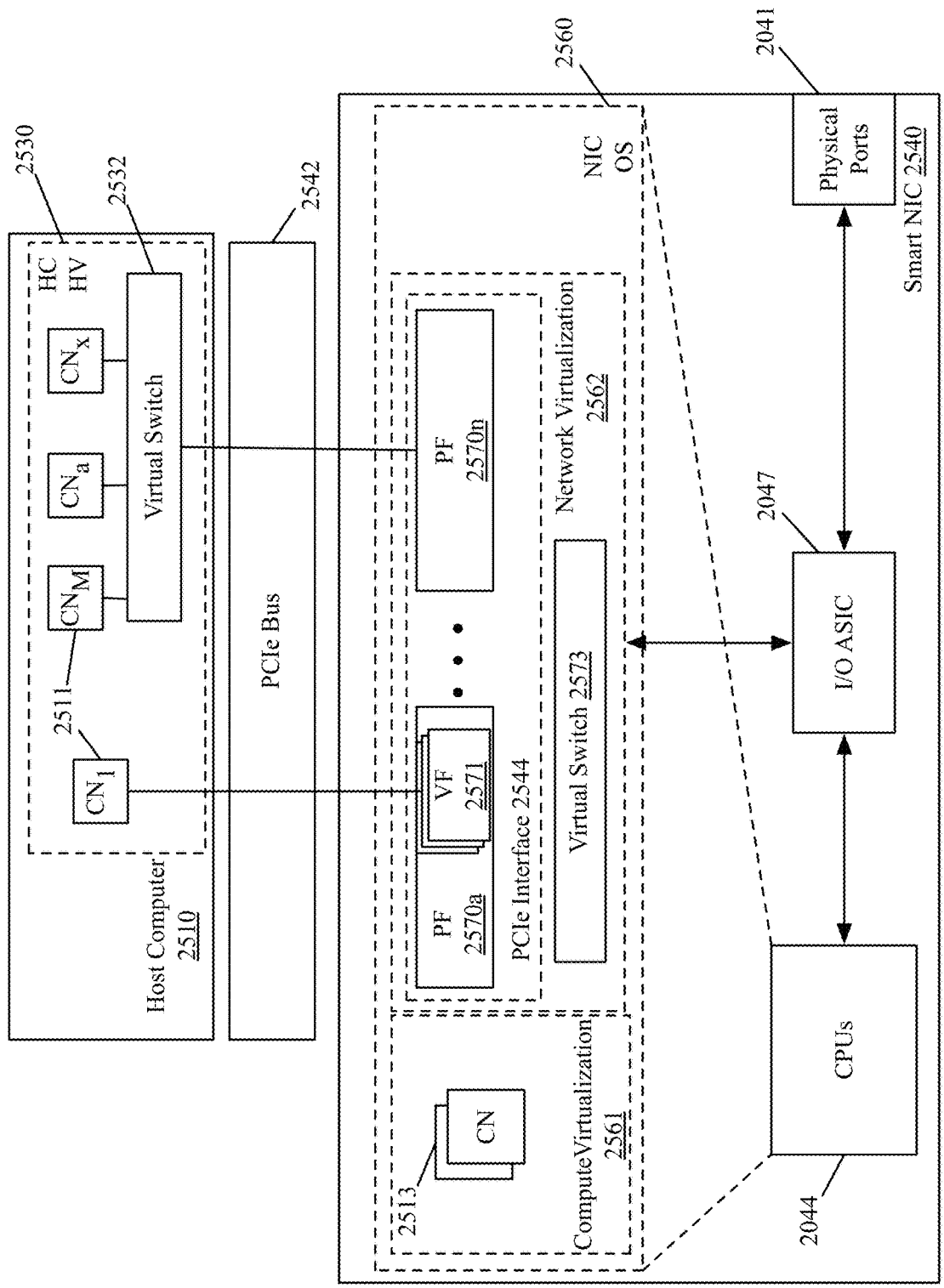
FIG. 25 illustrates a smart NIC providing compute virtualization and network virtualization to provide virtualized resources (e.g., compute nodes, physical functions, and a set of virtual functions) to be used by compute nodes executing on a host computer.

FIG. 25 illustrates a smart NIC 2540 providing compute virtualization 2561 and network virtualization 2562 to provide virtualized resources (e.g., compute nodes 2513, physical functions 2570a-n, and a set of virtual functions 2571) to be used by compute nodes 2511 executing on a host computer 2510 (depicted as executing within a host computer hypervisor 2530). In some embodiments, compute nodes 2513 are edge gateway machines that provide gateway services for compute nodes 2511 executing on host computer 2510.

Network virtualization 2562 provides a virtualized PCIe interface that presents the PCIe bus 2542 as including a set of physical functions (PFs 2570a-n) as defined above and, for a set of physical functions, a set of virtual functions 2571. Both the host computer hypervisor 2530 and NIC OS 2560 execute a virtual switch 2532 that provides logical routing and logical switching operations for compute nodes (virtual machines, container, Pods, etc.). In some embodiments, a virtual switch 2573 on the smart NIC 2540 provides logical forwarding operations for compute nodes on both the smart NIC 2540 and on the host computer 2510. In some embodiments, the virtual switch 2573 interacts with the I/O ASIC 2047 to perform data message processing offload (e.g., flow processing offload) on behalf of the host computer 2510.

Figure 26:
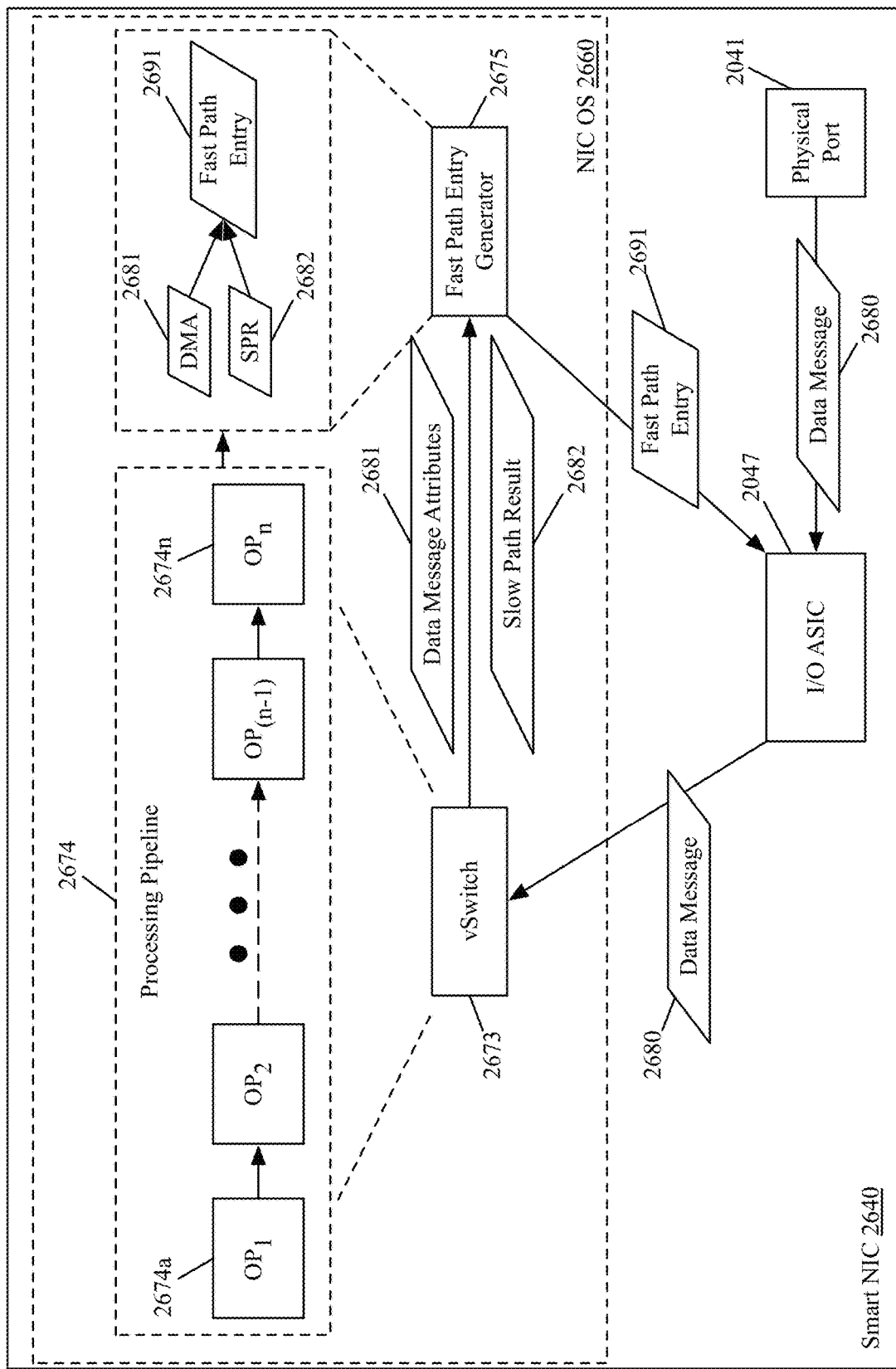
FIG. 26 illustrates an interaction between an I/O ASIC, a virtual switch, and a fast path entry generator, in some embodiments.

FIG. 26 illustrates an interaction between an I/O ASIC 2047, a virtual switch 2673, and a fast path entry generator 2675, in some embodiments. In some embodiments, I/O ASIC 2047 is configured to perform fast path processing for data messages to and from compute nodes executing on host computers connected to smart NIC 2640. In some embodiments, for first data messages in a data message flow (e.g., data message 2680), the I/O ASIC 2047 is programmed to provide data message 2680 to a virtual switch 2673 executing in the NIC OS 2660. The virtual switch 2673 processes the data message 2680 through a processing pipeline 2674. Processing pipeline 2674 includes operations 2674a-n. The operations 2674a-n, in some embodiments, include a set of logical forwarding operations (logical switching, bridging, routing, etc.). In some embodiments, the operations 2674a-n also include a set of middlebox services (e.g., firewall, load balancing, deep packet inspection, etc.) enabled for a particular logical network (e.g., belonging to a particular logical tenant associated with the data message 2680). The processing pipeline 2674, in some embodiments, identifies a particular set of data message attributes 2681 used to identify a data message flow or set of data message flows to which the data message 2680 belongs and determines a particular set of actions (e.g., slow path result 2682) to take for future data messages matching the identified data message attributes 2681. The data message attributes 2681 and slow path results 2682 are then provided to fast path entry generator 2675 to be combined into a fast path entry 2691 to be programmed into I/O ASIC 2047 to process future data messages having attributes that match the identified data message attributes 2681.

Figure 27:
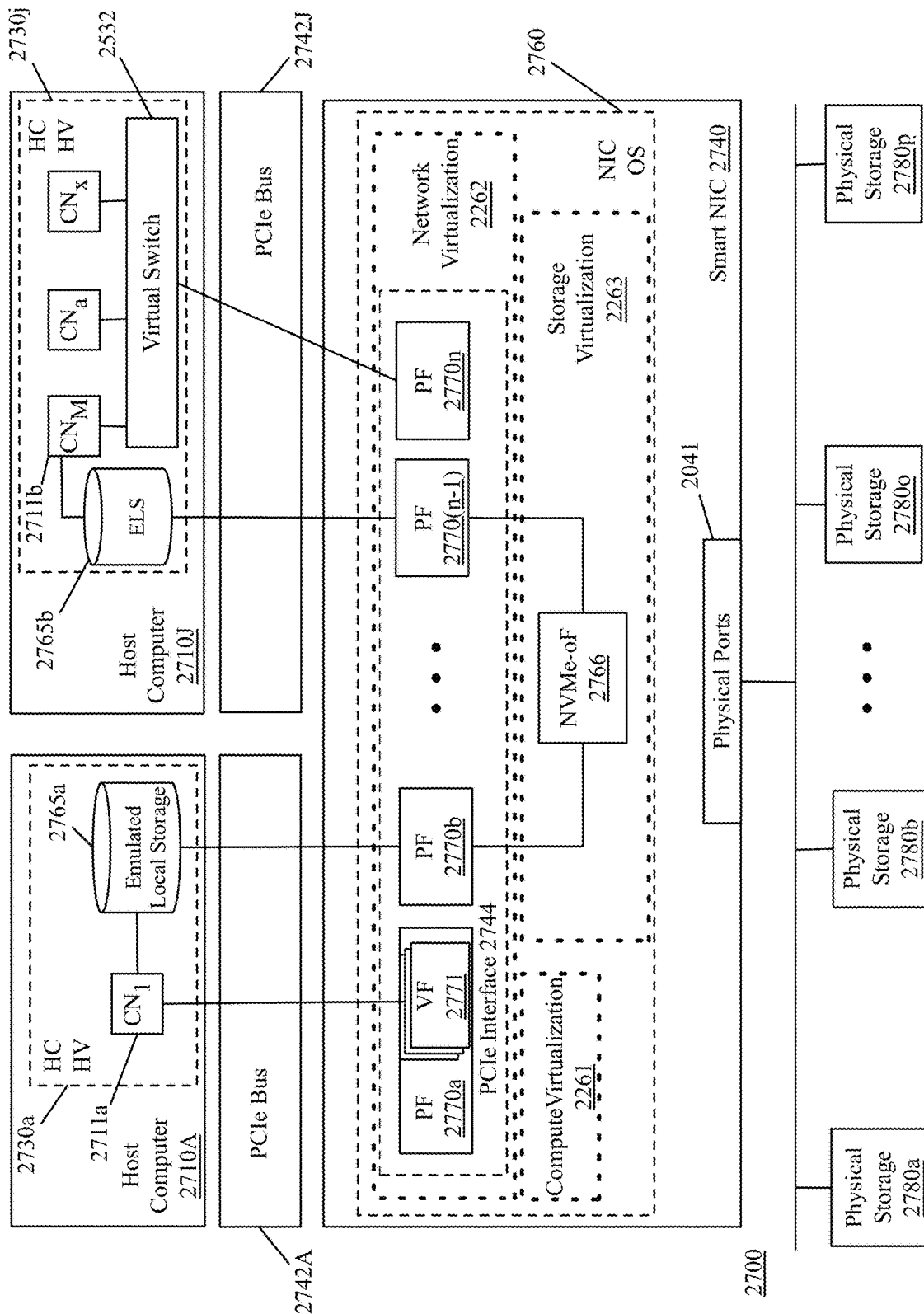
FIG. 27 illustrates a system including a smart NIC and a set of host computers connected to the smart NIC through two different PCIe buses.

FIG. 27 illustrates a system 2700 including a smart NIC 2740 and a set of host computers 2710A-J connected to the smart NIC 2740 through two different PCIe buses 2742A and 2742J. The smart NIC 2740 has a NIC OS 2760. Each PCIe bus 2742 is used to present virtualized elements of the smart NIC 2740 as different devices connected to the host computers 2710A-J. For example, PF 2770a and 2770n present as a NIC, while PF 2770b and 2770(n–1) present as connected storage devices. PF 2770a, as shown, presents a set of VFs 2771 as passthrough ports bypassing a virtual switch (not shown) of host computer 2710A. PF 2770b and 2770(n–1) appear to the host computers 2710A and 2710J, the hypervisors 2730a-j executing on these computers, and the compute nodes 2711a-b that execute on the hypervisors 2730 as (emulated) local storages 2765a and 2765b connected by a PCIe bus 2742. The emulated local storages 2765 may appear as a local storage, a virtual storage area network, or virtual volume. In some embodiments, the storage virtualization 2263 backs the emulated local storage 2765 with a virtualized storage using non-volatile memory express (NMVe) or NVMe over fabrics (NVMe-OF) 2766. The virtualized storage, in some embodiments, communicates with an external storage that is located on multiple physical storage devices 2780a-p. The communication, in some embodiments, uses NVMe-oF based on remote direct memory access (RDMA) or transport control protocol (TCP).

Figure 28:
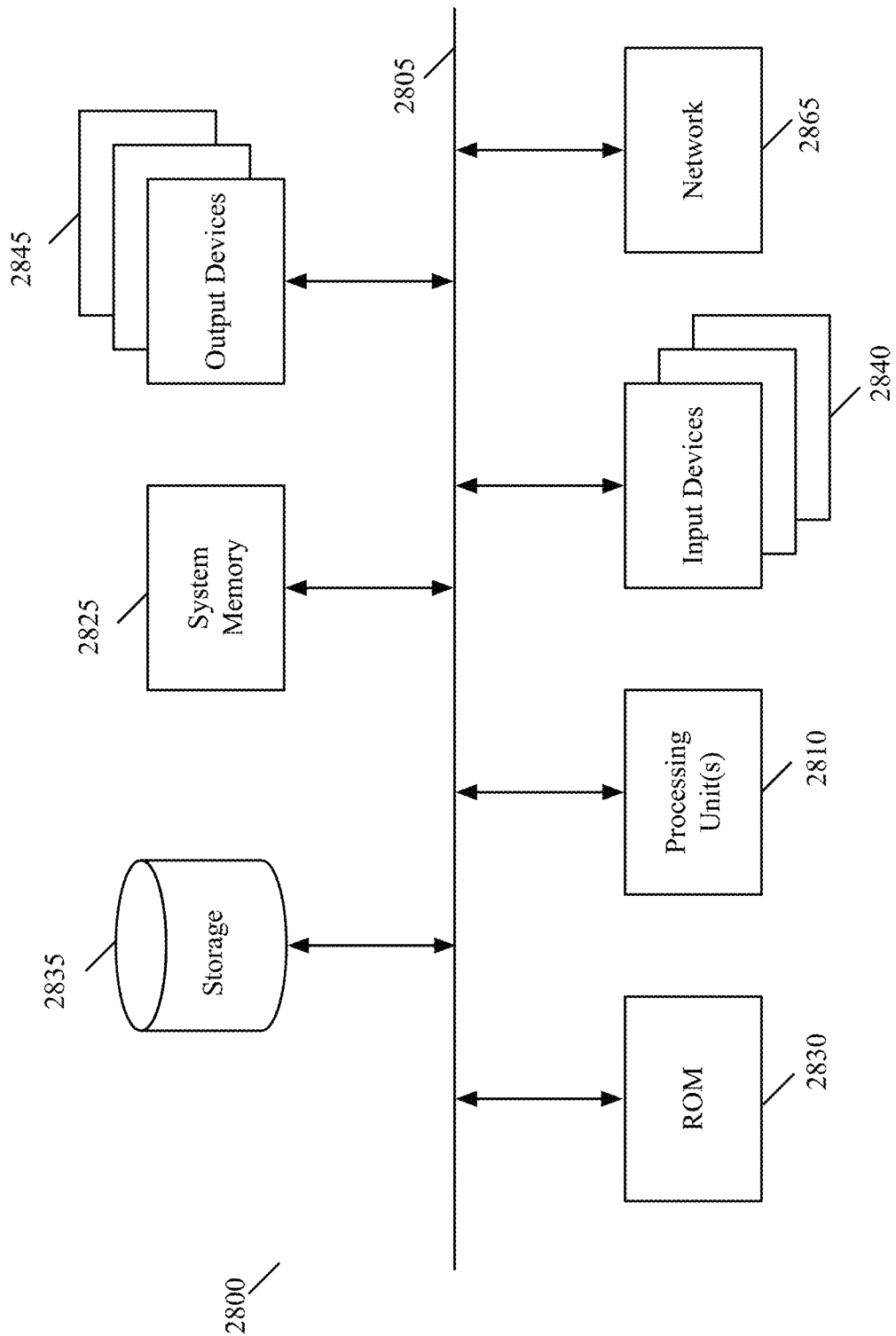
FIG. 28 conceptually illustrates an electronic system with which some embodiments of the invention are implemented.

FIG. 28 conceptually illustrates an electronic system 2800 with which some embodiments of the invention are implemented. The electronic system 2800 can be used to execute any of the control, virtualization, or operating system applications described above. The electronic system 2800 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 2800 includes a bus 2805, processing unit(s) 2810, a system memory 2825, a read-only memory 2830, a permanent storage device 2835, input devices 2840, and output devices 2845.

The bus 2805 collectively represents all system, peripheral, and chipset buses that communicatively connect the numerous internal devices of the electronic system 2800. For instance, the bus 2805 communicatively connects the processing unit(s) 2810 with the read-only memory 2830, the system memory 2825, and the permanent storage device 2835.

From these various memory units, the processing unit(s) 2810 retrieve instructions to execute and data to process in order to execute the processes of the invention. The processing unit(s) may be a single processor or a multi-core processor in different embodiments.

The read-only-memory (ROM) 2830 stores static data and instructions that are needed by the processing unit(s) 2810 and other modules of the electronic system. The permanent storage device 2835, on the other hand, is a read-and-write memory device. This device is a non-volatile memory unit that stores instructions and data even when the electronic system 2800 is off. Some embodiments of the invention use a mass-storage device (such as a magnetic or optical disk and its corresponding disk drive) as the permanent storage device 2835.

Other embodiments use a removable storage device (such as a floppy disk, flash drive, etc.) as the permanent storage device. Like the permanent storage device 2835, the system memory 2825 is a read-and-write memory device. However, unlike storage device 2835, the system memory is a volatile read-and-write memory, such a random access memory. The system memory 2825 stores some of the instructions and data that the processor needs at runtime. In some embodiments, the invention's processes are stored in the system memory 2825, the permanent storage device 2835, and/or the read-only memory 2830. From these various memory units, the processing unit(s) 2810 retrieve instructions to execute and data to process in order to execute the processes of some embodiments.

The bus 2805 also connects to the input and output devices 2840 and 2845. The input devices 2840 enable the user to communicate information and select commands to the electronic system. The input devices 2840 include alphanumeric keyboards and pointing devices (also called "cursor control devices"). The output devices 2845 display images generated by the electronic system 2800. The output devices 2845 include printers and display devices, such as cathode ray tubes (CRT) or liquid crystal displays (LCD). Some embodiments include devices such as a touchscreen that function as both input and output devices.

Finally, as shown in FIG. 28, bus 2805 also couples electronic system 2800 to a network 2865 through a network adapter (not shown). In this manner, the computer can be a part of a network of computers (such as a local area network ("LAN"), a wide area network ("WAN"), or an Intranet, or a network of networks, such as the Internet. Any or all components of electronic system 2800 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application-specific integrated circuits (ASICs) or field-programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, are non-VM DCNs that include a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. For instance, several examples were provided above by reference to specific distribute storage processes, such as vSAN. One of ordinary skill will realize that other embodiments use other distributed storage services (e.g., vVol offered by VMware, Inc.). The vSAN and vVol services of some embodiments are further described in U.S. Pat. Nos. 8,775,773 and 9,665,235, which are hereby incorporated by reference. Thus, one of ordinary skill in the art would understand that the invention is not to be limited by the foregoing illustrative details, but rather is to be defined by the appended claims.

We claim:

1. A non-transitory machine readable medium storing a program for emulating a virtual disk for a host computer from a smart network interface card (NIC) of the host computer, the program for execution by at least one processing unit of the smart NIC, the program comprising sets of instructions for:
   accessing, through a network fabric storage driver, a plurality of external storages each operating outside of the host computer;
   using a storage emulator program that performs an emulation operation to present the plurality of external storages as a virtual disk to a set of one or more host programs executing on the host computer as if the plurality of external storages are a single local storage of the host computer;
   forwarding read/write requests to the plurality of external storages when receiving read/write requests from the set of host programs to the virtual disk; and
   providing responses to the read/write requests after receiving responses from the plurality of external storages to the forwarded read/write requests.

2. The non-transitory machine readable medium of claim 1, wherein
   the requests and responses are forwarded and received at the smart NIC through a network fabric storage driver,
   the set of instructions for forwarding comprising translating read/write requests from a first format for the virtual disk to a second format for the network fabric storage driver, and
   the set of instructions for providing comprising a set of instructions for translating read/write requests from the second format to the first format before providing the responses to a NIC interface of the host computer to be processed by the set of host programs.

3. The non-transitory machine readable medium of claim 2, wherein the NIC interface is a peripheral component interconnect express (PCIe) interface, the first format is a non-volatile memory express (NVMe) format, the second format is an NVMe over fabric (NVMeOF) format, and the network fabric storage driver is an NVMeOF driver.

4. The non-transitory machine readable medium of claim 2, wherein the set of instructions for forwarding comprises a set of instruction for using a port of the smart NIC that is used for forwarding packets not related to the plurality of external storages.

5. The non-transitory machine readable medium of claim 2, wherein in addition to the processing unit, the smart NIC comprises an application specific integrated circuit (ASIC), and a memory that stores the program for execution by the processing unit, the ASIC for processing packets forwarded to and from the host computer, the set of instructions for processing comprising at least a portion of the translation of the read/write requests.

6. The non-transitory machine readable medium of claim 5, wherein the program executed by the processing unit is a virtualization program for sharing resources of the smart NIC, the shared resources including the port through which the plurality of external storages is accessed.

7. The non-transitory machine readable medium of claim 1, wherein using the storage emulator program comprises creating, through a storage emulation layer, the virtual disk to represent the plurality of external storages as the single local storage of the host computer.

8. The non-transitory machine readable medium of claim 7, wherein the emulation layer does not account for, and the virtual disk does not represent, any storage on the smart NIC.

9. The non-transitory machine readable medium of claim 1, wherein the set of instructions for using the storage emulator program comprises a set of instruction for creating, through a storage emulation layer, the virtual disk to represent the plurality of external storages as the single local storage of the host computer along with at least one storage on the smart NIC.

10. The non-transitory machine readable medium of claim 1, wherein the set of host programs comprises host programs specifying machines executing on the host computer, the machines including virtual machines or containers.

11. A method of providing a virtual disk to a host computer from a network interface card (NIC) of the host computer, the method comprising
at the NIC:
accessing, through a network fabric storage driver, a plurality of external storages each operating outside of the host computer;
presenting the plurality of external storages as a virtual disk to a set of one or more programs executing on the host computer; and
forwarding read/write requests to the plurality of external storages when receiving read/write requests from the set of programs to the virtual disk, and
providing responses to the read/write requests after receiving responses from the plurality of external storages to the forwarded read/write requests.

12. The method of claim 11, wherein
the requests and responses are sent and received at the NIC through a network fabric storage driver,
said forwarding comprising translating read/write requests from a first format for the virtual disk to a second format for the network fabric storage driver,
said providing comprising translating read/write requests from the second format to the first format before providing the responses to an NIC interface of the host computer to be processed by the set of programs.

13. The method of claim 12, wherein the NIC interface is a peripheral component interconnect express (PCIe) interface, the first format is a non-volatile memory express (NVMe) format, the second format is an NVMe over fabric (NVMeOF) format, and the network fabric storage driver is an NVMeOF driver.

14. The method of claim 12, wherein the forwarding comprises using a port of the NIC that is used for forwarding packets not related to the plurality of external storages.

15. The method of claim 12, wherein the NIC comprises an application specific integrated circuit (ASIC), a general purpose central processing unit (CPU) and a memory that stores a first program for execution by the CPU to perform the accessing and presenting, the ASIC for processing packets forwarded to and from the host computer, said processing comprising at least a portion of the translation of the read/write requests.

16. The method of claim 15, wherein the first program is a virtualization program for sharing resources of the NIC, the shared resources including the port through which the plurality of external storages is accessed.

17. The method of claim 11, wherein presenting the virtual disk comprises creating, through a storage emulation layer, the virtual disk to represent the plurality of external storages as a local storage of the host computer.

18. The method of claim 17, wherein the storage emulation layer does not account for, and the virtual disk does not represent , any storage on the NIC.

19. The method of claim 11, wherein presenting the virtual disk comprises creating, through a storage emulation layer, the virtual disk to represent the plurality of external storages and at least one storage on the NIC, as a local storage of the host computer.

20. The method of claim 11, wherein the set of programs comprise programs specifying machines executing on the host computer, the machines including virtual machines or containers.

* * * * *